US009904896B2

(12) United States Patent
Cowart et al.

(10) Patent No.: US 9,904,896 B2
(45) Date of Patent: Feb. 27, 2018

(54) OBJECT MANAGEMENT SYSTEM

(75) Inventors: George Stephen Cowart, Mount Pleasant, SC (US); Steven James Kumpf, Charleston, SC (US); Kyle K. Hagberg, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 162 days.

(21) Appl. No.: 13/230,534

(22) Filed: Sep. 12, 2011

(65) Prior Publication Data
US 2013/0067362 A1    Mar. 14, 2013

(51) Int. Cl.
G06F 17/30      (2006.01)
G06Q 10/06     (2012.01)
G06Q 50/04     (2012.01)

(52) U.S. Cl.
CPC ............ G06Q 10/06 (2013.01); G06Q 50/04 (2013.01); Y02P 90/30 (2015.11)

(58) Field of Classification Search
CPC .................................................. G06F 17/5095
USPC ....................................................... 707/738
See application file for complete search history.

(56) References Cited

U.S. PATENT DOCUMENTS

| | | | |
|---|---|---|---|
| 6,336,078 B1 * | 1/2002 | Sakayori et al. ................ | 702/81 |
| 6,493,857 B1 | 12/2002 | Nakagawa et al. | |
| 7,127,458 B1 * | 10/2006 | Mantripragada et al. ........ | 707/6 |
| 7,209,869 B1 * | 4/2007 | Kroger et al. .................... | 703/1 |
| 7,321,804 B2 | 1/2008 | Zayic et al. | |
| 7,546,394 B1 | 6/2009 | Jocobson et al. | |
| 7,962,512 B1 * | 6/2011 | Sholtis et al. ................. | 707/777 |
| 8,290,830 B2 * | 10/2012 | Evans et al. ................... | 705/305 |
| 8,380,588 B2 * | 2/2013 | Batra ................ | G06F 17/30955 705/29 |
| 2003/0220852 A1 * | 11/2003 | Back et al. ..................... | 705/29 |
| 2006/0117012 A1 * | 6/2006 | Rizzolo ................. | G06Q 10/06 707/9 |
| 2006/0228041 A1 * | 10/2006 | Joshi ....................... | G03F 7/705 382/260 |
| 2007/0106410 A1 * | 5/2007 | Bouffiou et al. ................ | 700/97 |
| 2007/0156543 A1 * | 7/2007 | Klim et al. ..................... | 705/28 |
| 2008/0003533 A1 * | 1/2008 | Kung ............................ | 432/106 |
| 2008/0114640 A1 * | 5/2008 | Knipfer et al. ................. | 705/10 |

(Continued)

FOREIGN PATENT DOCUMENTS

| | | |
|---|---|---|
| JP | 2000-194741 | 7/2000 |
| JP | 2005-107983 | 4/2005 |
| JP | 2009-059236 | 3/2009 |

OTHER PUBLICATIONS

Koh et al., "Parts verification for multi-level-dependent demand manufacturing system: a recognition and classification structure".*

(Continued)

Primary Examiner — Neveen Abel Jalil
Assistant Examiner — Dawaune Conyers
(74) Attorney, Agent, or Firm — Womble Bond Dickinson (US) LLP

(57) ABSTRACT

A method and apparatus for managing a configuration of a vehicle structure. Data sets are compared each representing the configuration of the vehicle structure at different phases in a lifecycle of the vehicle structure. Each of the data sets includes identifications of components for the vehicle structure. Differences are identified between the identifications of the components in the data sets.

27 Claims, 16 Drawing Sheets

(56) References Cited

U.S. PATENT DOCUMENTS

| | | |
|---|---|---|
| 2008/0114660 A1 | 5/2008 | Berkooz et al. |
| 2008/0120208 A1 | 5/2008 | Berkooz |
| 2008/0301012 A1* | 12/2008 | Cogswell et al. .............. 705/29 |
| 2010/0030767 A1 | 2/2010 | Kim et al. |
| 2011/0125303 A1* | 5/2011 | Rollmann et al. .............. 700/98 |
| 2011/0173103 A1 | 7/2011 | Batra et al. |

OTHER PUBLICATIONS

Epicor Software, "Epicor Product Data Management", Mar. 2010.*

"Integrating Engineering and Manufacturing Bill of Material Through ERP Software Solutions", Global Shop Solutions, ERP Manufacturing Software, Mar. 30, 2007, 1 page, accessed Sep. 12, 2011, http://www.globalshopsolutions.com/blog/?p=8.

"PLM and ERP Integration", Enabling Technologies, International TechneGroup Incorporated, 1 page, accessed Sep. 12, 2011, http://www.iti-oh.com/products/plmerp.htm.

Chinese Office Action for Application No. 201210337126.9 dated Jun. 2, 2017.

Japanese Office Action dated Aug. 9, 2016 in Japanese Patent Application No. 2012-199055.

\* cited by examiner

FIG. 4

| PART NUMBER | LOCATION INDEX | VENDOR PART NUMBER | MATERIAL | WEIGHT (kg) | DRAWING NUMBER | INSTALLATION SIDE | MAXIMUM STORAGE TEMPERATURE, (F) |
|---|---|---|---|---|---|---|---|
| | | | | | | | |
| | | | | | | | |

DESIGN DATA

FIG. 5

| PART NUMBER | LOCATION INDEX | INSTALLATION TOOL | CERTIFICATION REQUIRED | STORAGE LOCATION | ASSEMBLY JIG NUMBER | INSTALLATION SIDE | ASSEMBLY CELL |
|---|---|---|---|---|---|---|---|
| | | | | | | | |
| | | | | | | | |

AS-BUILT DATA

DESIGN DATA 124 400 422

| PART NUMBER | LOCATION INDEX | VENDOR PART NUMBER | MATERIAL | WEIGHT (kg) | DRAWING NUMBER | INSTALLATION SIDE | MAXIMUM STORAGE TEMPERATURE, (F) |
|---|---|---|---|---|---|---|---|
| ABC | 002345 | 78-321R | ALUMINUM | 5.79 | DWG-45.2 | RIGHT | 100 |
| ABC | 002346 | 78-321R | ALUMINUM | 5.79 | DWG-45.2 | LEFT | 100 |

AS-BUILT DATA 128 500 522

| PART NUMBER | LOCATION INDEX | INSTALLATION TOOL | CERTIFICATION REQUIRED | STORAGE LOCATION | ASSEMBLY JIG NUMBER | INSTALLATION SIDE | ASSEMBLY CELL |
|---|---|---|---|---|---|---|---|
| ABC | 002345 | TW-8786 | YES | W-98 | DWG-45.2 | RIGHT | 810 |

FIG. 6

OBJECT MANAGEMENT SYSTEM

BACKGROUND INFORMATION

1. Field

The present disclosure relates generally to managing objects and, in particular, to managing configurations for objects. Still more particularly, the present disclosure relates to a method and apparatus for managing a configuration of an object during different phases in the lifecycle of the object.

2. Background

Oftentimes, objects, such as aircraft, trains, ships, and other platforms, have complex configurations. These complex configurations may have thousands or hundreds of thousands of components. Ensuring that an object has been manufactured with the correct configuration as specified in a design for the object is desirable as part of managing the object during a lifecycle of the object. The lifecycle of an object may include phases, such as, for example, without limitation, the design of the object, the creation of a plan for manufacturing the object, the manufacturing of the object, inspection of the object, maintenance for the object, and/or other suitable types of phases.

Typically, different bills of materials are created for an object during the different phases in the lifecycle of the object. A bill of materials (BOM) is a list of the raw materials, sub-assemblies, intermediate assemblies, sub-components, parts, and/or other components needed for object. A bill of materials also may include the quantities of the components and other suitable information used for the object.

A bill of materials may be used to define an object at any phase of the lifecycle of the object. For example, an engineering bill of materials (EBOM) defines an object at the design phase. The engineering bill of materials identifies the components needed for manufacturing the object as specified in a design for the object. The design may take the form of, for example, a computer-aided design (CAD) model.

As another example, a manufacturing bill of materials (MBOM) defines an object during a manufacturing phase and/or after manufacturing of the object has been completed. In particular, the manufacturing bill of materials identifies the components of the object as the object is being and/or has been built.

Typically, an object is considered to have a correct configuration when the manufacturing bill of materials can be reconciled with the engineering bill of materials. Reconciling these two different bills of materials includes making sure that both bills of materials are consistent with each other and define substantially the same configuration for the object.

With currently available systems for managing objects, ensuring that the different bills of materials for a particular object are reconciled may be more time-consuming and difficult than desired. For example, the different bills of materials for a particular object may be created at different times and/or using different systems. These bills of materials may be compatible with different software, have different formats, contain different data types and/or data content, identify different versions of components, and/or have other differences. As a result, detecting discrepancies between the different bills of materials may take more time, effort, and/or resources than desired.

For example, an engineering bill of materials for an aircraft may be created using a computer-aided design model of the aircraft. The manufacturing bill of materials may be created by operators at some later point in time using the engineering bill of materials and/or the model of the aircraft. The engineering and manufacturing bills of materials may not have the same format and/or may identify the components that form the configuration for the object in the same manner. Detecting discrepancies between engineering and manufacturing bills of materials may take more time, effort, and/or resources than desired.

Therefore, it would be advantageous to have a method and apparatus that takes into account at least some of the issues discussed above, as well as other possible issues.

SUMMARY

In one advantageous embodiment, a method for managing a configuration of a vehicle structure is provided. Data sets are compared each representing the configuration of the vehicle structure at different phases in a lifecycle of the vehicle structure. Each of the data sets includes identifications of components for the vehicle structure. Differences are identified between the identifications of the components in the data sets.

In another advantageous embodiment, an apparatus comprises a computer system. The computer system is configured to compare data sets each representing a configuration of a vehicle structure at different phases in a lifecycle of the vehicle structure. Each of the data sets includes identifications of components for the vehicle structure. The computer system is further configured to identify differences between the identifications of the components in the data sets.

In yet another advantageous embodiment, a vehicle manufacturing system comprises a storage system and an object manager. The storage system is configured to store data sets each representing a configuration of a vehicle structure at different phases in a lifecycle of the vehicle structure. Each of the data sets includes identifications of components for the configuration of the vehicle structure. The object manager is configured to compare a first data set representing the configuration of the vehicle structure at a first phase in the lifecycle of the vehicle structure with a second data set representing the configuration of the vehicle structure at a second phase in the lifecycle of the vehicle structure. The object manages is further configured to identify differences between the identifications of the components for the vehicle structure in the first data set and the identifications of the components for the vehicle structure in the second data set. The object manages is further configured to record dispositions provided for the differences in the storage system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 4 is an illustration of a data set in accordance with an advantageous embodiment;

FIG. 5 is an illustration of a data set in accordance with an advantageous embodiment;

FIG. 6 is an illustration of a comparison between two data sets in accordance with an advantageous embodiment;

DETAILED DESCRIPTION

The different advantageous embodiments recognize and take into account one or more different considerations. For example, the different advantageous embodiments recognize and take into account that the parts for an object may be different during different phases in a lifecycle of the object. For example, parts specified in a design for an object, such as an aircraft, may not match the parts specified in a manufacturing plan for manufacturing the aircraft. For example, an availability of parts may result in a different type of part than the part specified in the design for the aircraft being added to the manufacturing plan for the aircraft.

Further, the different advantageous embodiments recognize and take into account that when the manufacturing plan is used to manufacture the aircraft, the parts designated in the manufacturing plan may sometimes differ from the parts actually used to assemble the aircraft. The different advantageous embodiments recognize and take into account that these differences may occur based on an availability of parts, a client request to make a change to the aircraft after the manufacturing plan has been generated, a combination of the two, or for other reasons.

Further, the different advantageous embodiments recognize and take into account that it may be desirable to track the differences between the configuration specified in the design of the aircraft, the configuration planned for the aircraft, and the configuration for the aircraft actually built. Additionally, the different advantageous embodiments recognize and take into account that in some cases, updates to the design of the aircraft based on changes made when generating the manufacturing plan for the aircraft and/or actually assembling the aircraft may be desirable. Further, if changes are made for other reasons, such as regulatory or certification reasons, updating the data in the design of the aircraft also may be desirable. Further, updates for manufacturing plan also may be desirable based on these changes.

Thus, the different advantageous embodiments provide a method and apparatus for managing an object, such as a vehicle structure. In one advantageous embodiment, a method for managing a configuration of a vehicle structure is provided. Data sets, each representing the configuration of the vehicle structure at different phases in the lifecycle of the vehicle structure, are compared. Each data set includes identifications of components for the vehicle structure. Differences between the identifications of the components in the data sets are identified.

Figure 1:
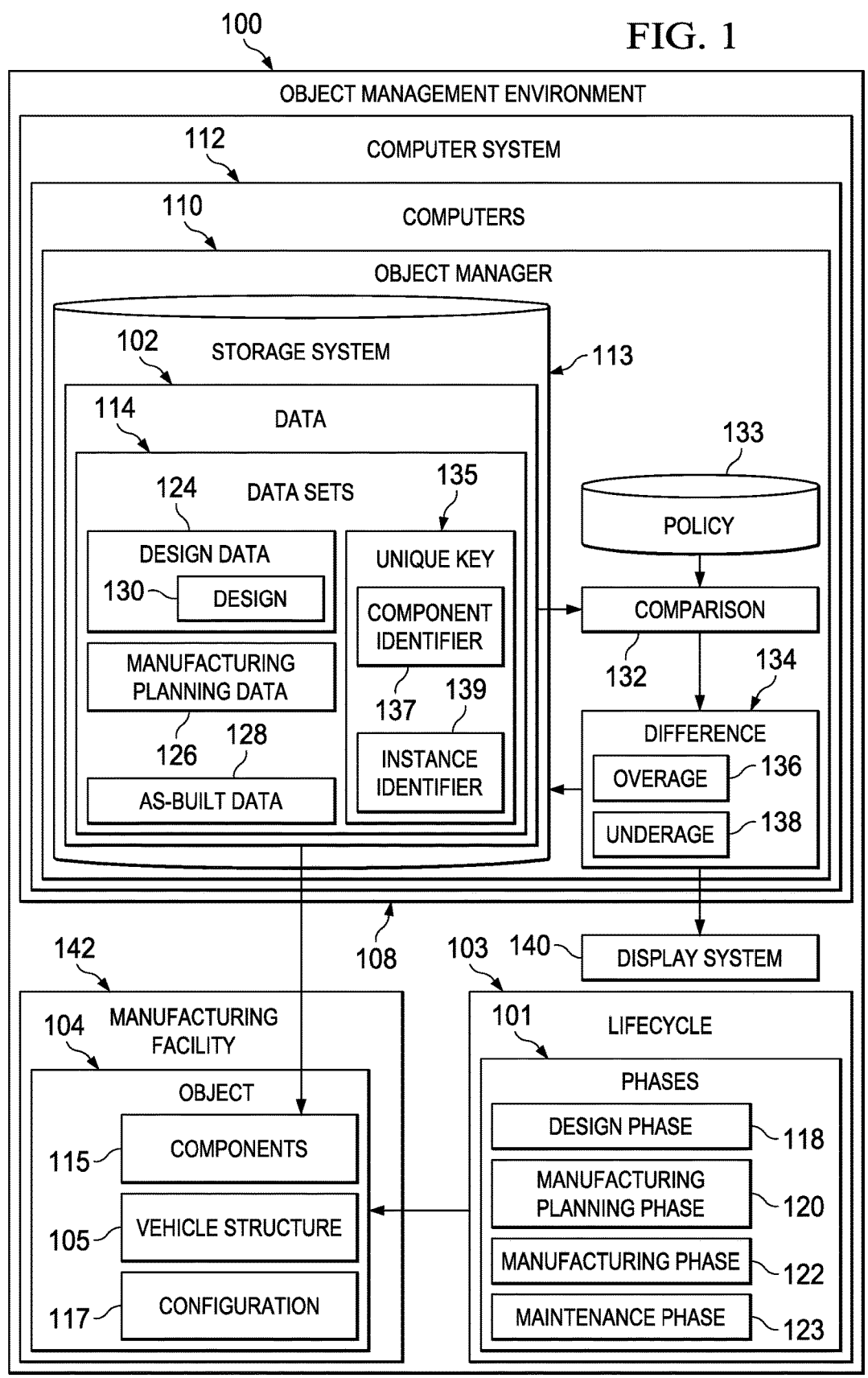
FIG. 1 is an illustration of a development environment in the form of a block diagram in accordance with an advantageous embodiment.

With reference now to FIG. 1, an illustration of an object management environment in the form of a block diagram is depicted in accordance with an advantageous embodiment. In FIG. 1, an object management environment 100 is an example of an environment in the form of a block diagram in which the different advantageous embodiments may be implemented to manage an object 104 during phases 101 in a lifecycle 103 of the object 104.

The different phases 101 in the lifecycle 103 of an object 104 may include, for example, without limitation, at least one of a conception phase, a design phase, a manufacturing planning phase, a manufacturing phase, a testing phase, a certification phase, a selling phase, a delivery phase, an in-use phase, an operation phase, an in-service phase, a support phase, a maintenance phase, a retirement phase, a recycling phase, a disposal phase, a reconfiguration phase, a re-engineering phase, and other suitable types of phases in the lifecycle 103 of the object 104. In some cases, one of the phases 101 in the lifecycle 103 of the object 104 may be a combination of two or more of the phases listed above.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In these illustrative examples, the object 104 may be a vehicle structure 105. The vehicle structure 105 may be selected from one of an aircraft, a spacecraft, an automobile, a train, a surface ship, a submarine, an aircraft structure, a jet engine, a wing box, an assembly for a vehicle, and/or some other suitable type of structure for a vehicle.

As depicted, object 104 may be managed using a computer system 108 in the object management environment 100. In particular, the computer system 108 is configured to manage data 102 used in the different phases 101 in the lifecycle 103 of the object 104. For example, an object manager 110 in the computer system 108 is configured to manage the data 102 used in the different phases 101 in the lifecycle 103 of the object 104.

The computer system 108 may take the form of a number of computers 112 in these illustrative examples. As used herein, a number of items means one or more items. For example, a number of computers means one or more computers. When the computers 112 include more than one computer, these computers are in communication with each other. The object manager 110 may be implemented as hardware, software, or a combination of the two in one or more of the computers 112 in the computer system 108.

In these illustrative examples, the data 102 for the object 104 is in the form of data sets 114. The data sets 114 may be stored in a storage system 113 in the computer system 108. The storage system 113 may comprise any number of databases, tables, reports, logs, spreadsheets, and/or other types of data structures.

The data sets 114, in these depicted examples, identify components 115 for the object 104. The components 115 may include, for example, individual parts used in manufacturing the object 104, assemblies of parts, sub-assemblies of parts, and/or the object 104 itself. Further, the components 115 for the object 104 may include a number of designs, models, specifications, and/or other items used in the object 104. In one illustrative example, each of the data sets 114 may take the form of a bill of materials (BOM) used for the object 104.

As depicted, each of the data sets 114 identifying the components 115 for managing the object 104 may be for a different phase in the phases 101 in the lifecycle 103 of the object 104. In particular, each of the data sets 114 may include identifications of the components 115 that form a configuration 117 for the object 104 at a particular phase in the lifecycle 103 of the object 104.

In other words, the identifications of the components 115 for the object 104 in a particular data set of the data sets 114 represent the configuration 117 for the object 104 at the phase corresponding to the particular data set. The configuration 117 for an object 104 includes the particular parts, sub-assemblies, assemblies, and/or other components for the object 104 as well as the manner in which these different components are assembled to form the object 104.

As one illustrative example, the data sets 114 may include data for a design phase 118, a manufacturing planning phase 120, and a manufacturing phase 122 in the lifecycle 103 of the object. In particular, the data sets 114 may include design data 124 for the design phase 118, manufacturing planning data 126 for the manufacturing planning phase 120, and as-built data 128 for the manufacturing phase 122.

The design data 124 identifies the components 115 specified in a design 130 for the object 104, relationships between the components 115 for the object 104, and other suitable information for the object 104. The design data 124 may also be referred to as "as-specified" data. In some cases, the design data 124 may include the design 130 itself. The design 130 of the object 104 may be, for example, a computer aided design (CAD) model of the object 104.

In one illustrative example, the design data 124 takes the form of an engineering bill of materials (EBOM) for the object 104. The engineering bill of materials may be represented in, for example, a hierarchical diagram identifying the design 130 of the object 104, assemblies specified in the design 130, subassemblies that form the assemblies, parts that form the subassemblies and/or assemblies of the object, and/or other suitable information as specified in the design 130.

In these illustrative examples, a hierarchical diagram is any diagram that shows relationships between the components 115 at different levels. One example of a hierarchical diagram may be a tree diagram. A tree diagram comprises linked nodes in which each node may have zero or more children nodes and, at most, one parent node.

Further, the manufacturing planning data 126 includes data that is used in planning the manufacturing of the object 104. The manufacturing planning data 126 may also be referred to as "as-planned" data. The manufacturing planning data 126 for the object 104 may include, for example, without limitation, an identification of the components 115 to be used in manufacturing the object 104, an identification of the assemblies and subassemblies to be formed using the components 115 for the object 104, instructions for manufacturing the object 104, and other suitable information for manufacturing the object 104.

As one illustrative example, the manufacturing planning data 126 may include a manufacturing plan for manufacturing the object 104, a number of shop orders for the different parts, sub-assemblies, assemblies, and/or other components needed to manufacture the object 104, and/or other suitable information. A shop order is a list of the components 115, such as parts, sub-assemblies, and/or assemblies, which need to be obtained to assemble the object 104. A component may be obtained by purchasing the component, assembling various parts to form the component, and/or obtaining the component in some other suitable manner. Further, a shop order may be, for example, a work order for a particular part.

In these illustrative examples, the manufacturing planning data 126 may be generated using the design data 124. For example, the manufacturing planning data 126 may be generated in the form of a sales bill of materials (SBOM) when the design data 124 takes the form of an engineering bill of materials. The sales bill of materials identifies the particular components that need to be ordered to manufacture the object 104. Similar to the engineering bill of materials, the sales bill of materials also may be represented in the form of a hierarchical diagram.

The as-built data 128 includes data generated for the object 104 after manufacturing of the object 104 has been completed and/or after manufacturing of subassemblies and/or assemblies that form the object 104 has been completed. In this manner, the as-built data 128 may be generated as the object 104 is physically being manufactured. The as-built data 128 is generated based on the actual components 115 and/or relationships between the components 115 in the object 104 that are used in manufacturing the object 104. In these illustrative examples, the as-built data 128 may be generated in the form of a manufacturing bill of materials (MBOM). The manufacturing bill of materials also may be represented in the form of a hierarchical diagram.

In these illustrative examples, each of the different data sets 114 may identify the components 115 for the object 104 using a unique key 135 for each of the components 115. The unique key 135 identifies a particular component in the components 115 such that the particular component may be distinguished from other components of the same type, part number, and/or model.

The unique key 135 may comprise a component identifier 137 and an instance identifier 139 for each component. These two pieces of information may be included for every component identified in each of the different data sets 114. The component identifier 137 may be, for example, a part number or a model number. Different components may have the same part identifier. For example, bolts of the same type and/or model may have the same part number.

The instance identifier 139 in the unique key 135 allows components having the same part identifier to be distinguished from each other. The instance identifier 139 for a component represents a precise installation instance for the bolt in the assembly. As one illustrative example, an assembly may include a group of bolts having the same part numbers. The instance identifier 139 used for a particular bolt may distinguish that bolt from the other bolts in the group of bolts using, for example, a location index for the particular bolt that describes a location of that bolt in the assembly.

In these illustrative examples, the unique key 135 is used for each component identified in each of the data sets 114. For example, the different data sets 114 may have different formats, include different pieces of information for different attributes for the components 115 identified, and/or have other differences. However, each of the data sets 114 uses the unique key 135 to distinguish between the different components 115. In this manner, the unique key 135 may be common to all of the data sets 114.

Additionally, in these depicted examples, the data 102 may include other information in addition to, and/or in place of, the design data 124, the manufacturing planning data 126, and the as-built data 128. For example, the data 102 may include work order details, notes, maintenance information, and/or other suitable information.

Depending on which phase in the phases 101 of the lifecycle 103 of the object 104 that the object 104 is in, one or more of the data sets 114 for the object 104 may be an empty set or a null set. For example, if the manufacturing planning phase 120 has not yet begun for the object 104, the manufacturing planning data 126 and the as-built data 128 for the object 104 may be empty data sets.

Further, the design data 124, the manufacturing planning data 126, and/or the as-built data 128 may be changed during any of the phases 101 in the lifecycle 103 of the object 104. For example, changes may be made to the design data 124 during the manufacturing planning phase 120. In some cases, changes may be made to the design data 124 during the manufacturing phase 122. Additionally, in managing the data 102 for the object 104, the object manager 110 updates the data 102 with new data as the new data for the object 104 is entered for the object 104.

Further, the object manager 110 may perform inspections of the data 102 at any time during the lifecycle 103 of the object 104. For example, these inspections may be performed while the object 104 is being manufactured, after an assembly for the object 104 has been completed, after manufacturing of the object 104 has been completed, when maintenance of the object 104 is being performed, and/or at other times during the lifecycle 103 of the object.

In one illustrative example, the object manager 110 selects at least two of the data sets 114 for inspection. This selection may be made based on, for example, user input received at the object manager 110. In some cases, all of the data sets 114 may be selected.

The object manager 110 compares the data sets 114 that are selected to form a comparison 132. Further, the object manager 110 uses the unique key 135 for each component in the components 115 identified in each of the data sets 114 selected for the comparison to form the comparison 132.

As one illustrative example, the design data 124 and the manufacturing planning data 126 may be selected for comparison. In this example, the object manager 110 compares the two data sets by determining whether the unique keys for the components 115 identified in the manufacturing planning data 126 match unique keys for the components 115 identified in the design data 124.

Further, the object manager 110 uses the comparison 132 and a policy 133 to determine whether any differences 131 are present between the data sets 114 that are selected. The policy 133 may include a number of rules, criteria, and/or other information for determining whether differences 131 are present between the data sets 114 based on the comparison 132 formed.

Differences 131 may be identified when the data 102 in the different data sets 114 does not match as desired. For example, differences 131 may be present when the components 115 and/or the relationships between the components 115 identified in the different data sets 114 do not match as desired. In particular, one or more differences 131 may be identified when the unique keys identified in one data set do not match the unique keys identified in another data set.

As depicted, a difference 134 may comprise an overage 136 of the components 115 for the object 104, an underage 138 of the components 115 for the object, or a combination of the two. An overage 136 of the components 115 may be present when parts not identified in the data 102 for one phase in the phases 101 of the lifecycle 103 of the object 104 are identified in the data 102 for another phase. For example, the overage 136 may be present when unique keys for parts not identified in the design data 124 for the object 104 are identified in the manufacturing planning data 126 and/or the as-built data 128. In this example, the overage 136 is with respect to the design data 124.

An underage 138 of the components 115 may be present when parts that are identified in the data 102 for one phase in the phases 101 of the lifecycle 103 of the object 104 are not identified in the data 102 for another phase. For example, the underage 138 may be present when the data 102 for the design data 124 identifies unique keys for parts that are not identified in the manufacturing planning data 126 and/or the as-built data 128. In this example, the underage 138 is with respect to the design data 124.

A difference 134 between the identifications of the components 115 in the data sets 114 may be present in response to a number of different factors. For example, a difference 134 may be present when a phase in the phases 101 of the lifecycle 103 of the object 104 has not yet been completed. As one illustrative example, the difference 134 may be present between the design data 124 and the as-built data 128 when the manufacturing phase 122 has not yet been completed for the object 104.

Further, the difference 134 may be present in response to an issue with the availability of parts, certain parts being discontinued, a client request for changes to one or more of the parts for the object 104, errors in the entry of the data 102 by a human operator, and/or other suitable factors.

In some illustrative examples, a difference 134 between the data sets 114 may be identified even when the unique keys for the components 115 identified in the data sets 114 match. For example, the unique keys identified in the design data 124 may match the unique keys identified in the manufacturing planning data 126. However, when performing the comparison 132, the object manager 110 may also compare the information associated with each unique key 135 for the components 115 in these two data sets to form the comparison 132.

The object manager 110 uses policy 133 and the comparison 132 of the information to determine whether one or more differences 131 are present. In this example, a difference 134 may be a discrepancy between the information associated with a unique key 135 in the design data 124 and the information associated with the same unique key 135 in the manufacturing planning data 126.

In these illustrative examples, the object manager 110 is configured to indicate when any differences 131 between the data sets 114 are identified. For example, the object manager 110 may visually present any differences 131 identified on a display on a display system 140. In particular, the indication may be displayed on a graphical user interface on the display system 140.

The display system 140 may be in communication with the computer system 108. In some illustrative examples, the display system 140 may be part of the computer system 108. The display system 140 may comprise a number of display devices that may be in any number of locations.

As one illustrative example, the object manager 110 displays an indication of any differences 131 on the display system 140 at a manufacturing facility 142 at which the object 104 is being manufactured. In this manner, an operator at the manufacturing facility 142 may be able to respond to the indication of any differences 131 between the data sets 114.

For example, when an indication of a difference 134 is displayed on the display system 140, the operator may determine whether the difference 134 between the components 115 identified in the data sets 114 requires a disposition. A disposition, in these illustrative examples, is a resolution for the difference 134. For example, a disposition may be a correction for the difference 134 when the difference 134 is an error, an explanation for the difference 134 when the difference 134 is a correct difference or some other suitable type of resolution for the difference 134.

Further, the disposition may include a description of the difference 134. For example, when the difference 134 is an error, the disposition may include an error description. When the difference 134 is a correct difference, the disposition may include a difference description. This difference description may be an explanation for the difference 134 and may indicate that the difference 134 is not an error.

The object manager 110 is configured to record dispositions 144 provided for differences 131. In recording these dispositions 144, the object manager 110 stores the dispositions 144 in the storage system 113.

When a difference 134 is identified, at least one of the object manager 110 and an operator establish whether the difference 134 is an error. For example, the operator may determine whether a difference 134 indicated on the display system 140 is the result of an error in the manufacturing of the object 104. If the difference 134 is the result of an error in the manufacturing of the object 104, the operator may respond by correcting the error. For example, the operator may correct the as-built data 128. This correction may be one form of providing a disposition for the difference 134.

As one illustrative example, the operator may enter new data for one or more of the data sets 114 to correct the error. The object manager 110 is configured to use the new data to update the data sets 114 such that the difference between the data sets 114 is no longer present after the data sets 114 are updated. As another example, if the error is that an incorrect part was used in the assembly of the object 104, the operator may replace the part in the object 104 with the new part and enter new data into one or more of the data sets 114 to correct the error.

In some cases, the difference 134 may not be the result of an error. For example, the difference 134 may have an explanation that makes the difference 134 correct or acceptable. When the difference 134 is not the result of an error, the operator may respond by entering data that provides an explanation for the difference 134 between the components 115 identified in the data sets 114.

For example, when the design data 124 identifies a part that is not identified in the as-built data 128, the operator may provide an explanation for the difference 134. The explanation may indicate that the part identified in the design data 124 was no longer available when building the object 104 and that a new part was used during manufacturing. This explanation is an example of another type of disposition for the difference 134.

In one illustrative example, the manufacturing planning data 126 may include instructions for a manufacturing plan for manufacturing the object 104. During manufacturing, a client using the manufacturing plan to manufacture the object 104 may make a change to one or more of the instructions. For example, the client may add a parameter, such as a torque value, to the instructions. This torque value may not be present in the design data 124.

Object manager 110 may identify the added torque value in the instructions as a difference 134 between the design data 124 and the manufacturing planning data 126. As a result, the torque value may be added to the design data 124. In this manner, future manufacturing plans and/or other information in the manufacturing planning data 126 generated using the design data 124 may include the torque value.

In other illustrative examples, however, an operator may provide an explanation for the difference 134 between the design data 124 and the manufacturing planning data 126. In particular, the operator may indicate that the torque value was added to the manufacturing plan due to special circumstances during the manufacturing of the object 104. The explanation may also indicate that the torque value is not to be added to the design data 124.

Once a disposition has been provided for a particular difference 134, the particular difference 134 may no longer be identified by the object manager 110 when future comparisons are formed. In other words, the particular difference 134 is no longer flagged as an error between the different data sets 114.

In some illustrative examples, the object manager 110 may indicate the difference 134 by generating and sending out a report identifying the difference 134 between the data sets 114. The report may be sent to a number of operators at the manufacturing facility 142 and/or at other locations.

In another illustrative example, the object manager 110 may indicate the difference 134 between the data sets 114 by performing at least one of sending out an email to an operator identifying the difference 134, recording the difference 134 in a database or table, generating a visible and/or audible alert, and some other suitable action to indicate that the data 102 in the data sets 114 does not match as desired.

In these illustrative examples, when an inspection of the data sets 114 indicates that differences 131 that represent errors are no longer present between the data sets 114, these data sets 114 are considered to be reconciled. In this manner, reconciling of the data sets 114 may be performed by ensuring that the different data sets 114 are consistent with each other, according to policy 133, and that dispositions 144 have been provided for any previously identified differences 131 between the data sets 114. Further, reconciling the data sets 114 ensures that the configuration 117 for the object 104 identified by each of the different data sets 114 is correct.

When the object 104 is an aircraft, the manufacturing facility 142 for the aircraft and the computer system 108 may be referred to as an aircraft manufacturing system. In these illustrative examples, some, all, or none of the computer system 108 may be located in the manufacturing facility 142.

In this manner, the object manager 110 provides a system for managing the data 102 for the object 104 to reduce a number of errors that may be present in the data 102 over time during the lifecycle 103 of the object 104. Further, this type of management of the data 102 may reduce the number of errors made when actually manufacturing the object 104.

Additionally, data for the comparison 132 formed may be saved in the storage system 113 for future use. Further, the identification of the difference 134 may also be stored for future use. For example, data from multiple comparisons performed by the object manager 110 during the developing of the object 104 may be saved. The object manager 110 may be configured to analyze this data and determine the evolution of the degree of matching between the different data sets 114.

For example, the data sets 114 may be compared on a daily basis and the results of this comparison saved and analyzed. In this manner, the progress in matching the different components 115 may be evaluated over the duration of the development process. Further, the progress of a particular component in the different components 115 may be evaluated. In some illustrative examples, the results of the comparison of the data sets 114 for one component in the components 115 may be compared with the results of the comparison of the data sets 114 for another component in the components 115.

An operator may also view the data stored from multiple comparisons performed over time to resolve repetitive issues with the matching of the components 115 in the different data sets 114 and/or spot trends in the matching of the components 115.

When the object 104 takes the form of a vehicle structure 105, the vehicle structure 105 may comprise hundreds, thousands, or hundreds of thousands of components 115. Inspecting the data 102 identifying the components 115 in the configuration 117 for the vehicle structure 105 at the different phases 101 in the lifecycle 103 of the vehicle structure 105 may be more time-consuming and require more effort than desired if performed manually by an operator.

For example, time constraints may be present for when identifications of differences 131 have to be made based on contracts, deadlines, regulations, and/or other suitable factors. Further, time constraints may be present in an effort to complete the vehicle structure 105 for delivery as fast as possible, when expected by a customer, or some combination thereof.

The object manager 110 in computer system 108 allows inspections of the data 102 to be performed more rapidly and more efficiently such that these different time constraints may be satisfied. Further, the object manager 110 may allow inspections of different pairs of data sets in the data sets 114 to be compared at substantially the same time. For example, the object manager 110 may compare the design data 124 with the manufacturing planning data 126, while also comparing the design data 124 with the as-built data 128.

The illustration of the development environment 100 in FIG. 1 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some illustrative examples, assemblies for the object 104 may be manufactured at a different manufacturing facility than manufacturing facility 142. In other illustrative examples, the object 104 may take some form other than a vehicle structure 105. For example, the object 104 may be a complex assembly, a complex structure, a building, a bridge, a computer system, a piece of furniture having a complex configuration, or some other suitable type of object.

Further, depending on the implementation, the disposition provided for any difference 134 identified may be performed by software running on computer system 108. In some cases, the disposition may be generated by an artificial intelligence (AI) implemented in computer system 108.

Additionally, in other illustrative examples, the data sets 114 stored in the storage system 113 may include data sets for other phases 101 in the lifecycle 103 of the object 104 other than the design phase 118, the manufacturing planning phase 120, and the manufacturing phase 122.

In one illustrative example, the data sets 114 may include reconfiguration data 146 for a reconfiguration phase 148. In the reconfiguration phase 148, a client may design a new configuration for the object 104 that is different from the configuration 117 for the object 104 as manufactured by a supplier. For example, the client may wish to change the type of valves used in a hydraulic system in the object 104. The client may enter new data to form the reconfiguration data 146 identifying the components 115 for the new configuration of the object 104.

The object manager 110 may be used to determine whether the new configuration for the object 104 meets requirements and can be re-certified. The object manager 110 forms a comparison 132 between the reconfiguration data 146 and the design data 124 for the object 104 using the policy 133. The policy 133 may include a number of criteria and/or requirements for changes to the design 130 of the object 104. The object manager 110 identifies any differences 131 between the reconfiguration data 146 and the design data 124 using the comparison 132.

Further, at least one of the object manager 110 and an operator may determine which of the differences 131 between the reconfiguration data 146 and the design data 124 meet the criteria and/or requirements of the policy 133 and which of the differences 131 are errors. Dispositions 144 may be provided for each of the differences 131 identified.

Depending on the details provided in the dispositions 144 for the differences 131 identified, changes may be made to at least one of the reconfiguration data 146 and the design data 124. In this illustrative example, the object manager 110 may also update other data sets in the data sets 114 when changes are made to the reconfiguration data 146 and/or the design data 124.

In this manner, the object manager 110 may be configured to manage the data 102 for the object 104 even after the fully assembled object 104 has been delivered to a client. Further, data sets 114 in the data 102 generated at any point in time during the lifecycle 103 of the object 104 may be compared to ensure that the data 102 is up-to-date and accurate. In some cases, two data sets may be generated during the same phase in the lifecycle 103 of the object 104. These two data sets may be compared to identify the differences 131 between the two data sets. In this manner, changes that occur during that phase in the lifecycle 103 may be evaluated.

Figure 2:
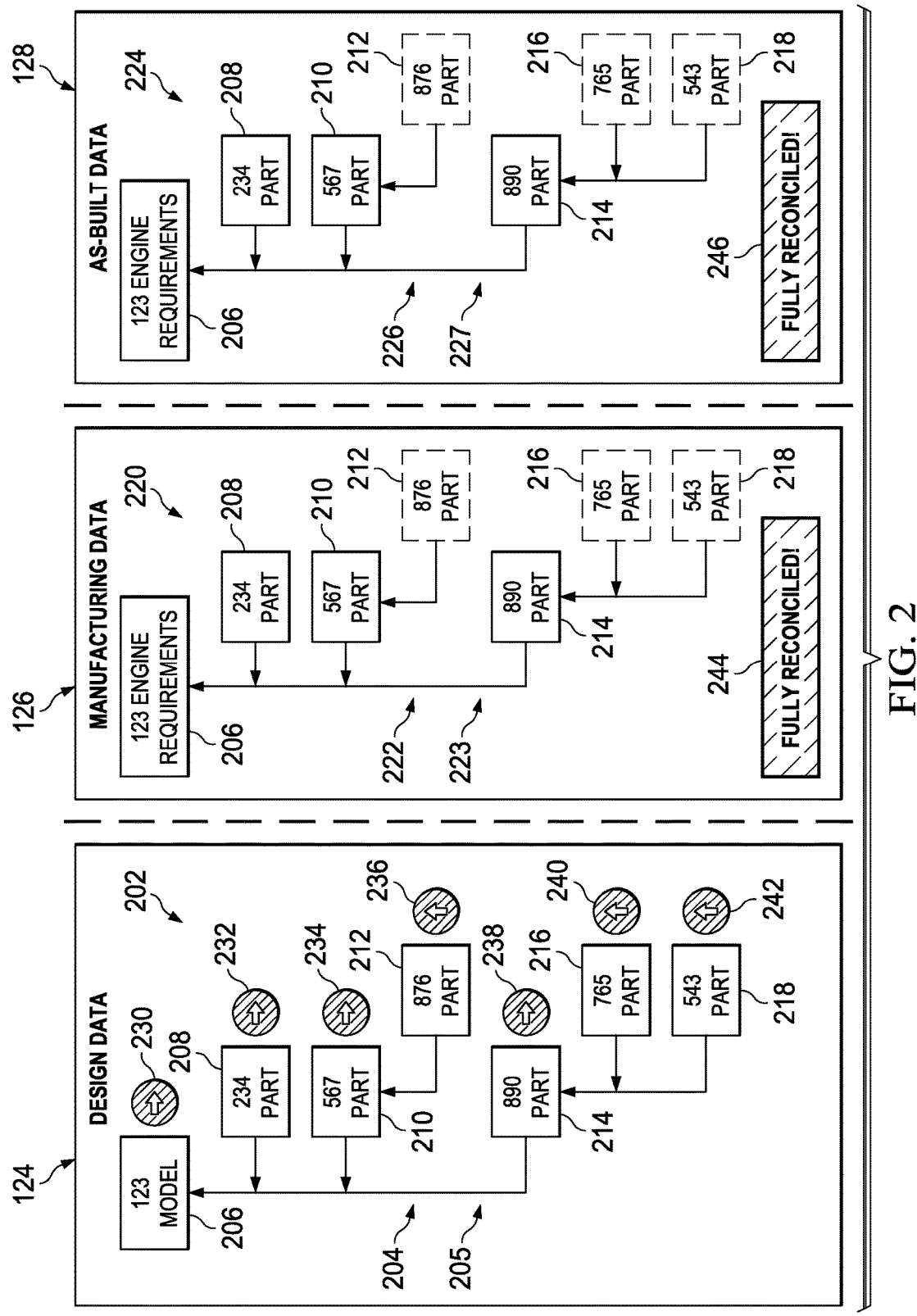
FIG. 2 is an illustration of data sets in accordance with an advantageous embodiment.

With reference now to FIG. 2, an illustration of data sets is depicted in accordance with an advantageous embodiment. In this illustrative example, examples of data sets 114 from FIG. 1 are depicted. In particular, an example of one implementation for the design data 124, the manufacturing planning data 126, and the as-built data 128 from FIG. 1 is depicted.

In this illustrative example, the design data 124, the manufacturing planning data 126, and the as-built data 128 are represented in the form of tree diagrams. These tree diagrams may be displayed on the display system 140 from FIG. 1.

In this illustrative example, the design data 124 may include a tree diagram 202. The tree diagram 202 identifies components 204. These components 204 may include, but not be limited to, a model 206, a first part 208, a second part 210, a third part 212, a fourth part 214, a fifth part 216, and a sixth part 218. These components 204 may be identified from a design plan for the vehicle structure 105 in FIG. 1. Further, these components 204 form a design configuration 205 for the vehicle structure 105.

As depicted, the second part 210 and the third part 212 form an assembly. Further, the fourth part 214, the fifth part 216, and the sixth part 218 form an assembly. The first part 208, the assembly formed by the second part 210 and the third part 212, and the assembly formed by the fourth part 214, the fifth part 216, and the sixth part 218 may be assembled to form the vehicle structure 105 in FIG. 1 according to the model 206.

In this illustrative example, the manufacturing planning data 126 also may include a tree diagram 220 identifying components 222. These components 222 may be identified from a manufacturing plan for manufacturing the vehicle structure 105 based on the design data 124. Further, these components 222 form a manufacturing plan configuration 223 for the vehicle structure 105.

Additionally, the as-built data 128 also may include a tree diagram 224 identifying components 226. These components 226 may be identified as the components actually assembled to form the vehicle structure 105. Further, these components 226 form an as-built configuration 227 for the vehicle structure 105.

When manufacturing of the vehicle structure 105 has been completed, the components 204 identified in the design data 124 should be the same as the components 222 identified in the manufacturing planning data 126 and the components 226 identified in the as-built data 128. The object manager 110 in FIG. 1 may select at least two of the design data 124, the manufacturing planning data 126, and the as-built data 128 for comparison in this illustrative example. This comparison may be used to determine whether any differences are present between these different data sets.

For example, the components 204 identified in the tree diagram 202 in the design data 124 may be compared to the components 222 identified in the tree diagram 220 for the manufacturing planning data 126. As depicted, a comparison between the design data 124 and the manufacturing planning data 126 determines that no differences are present between the components 204 identified in the design data 124 and the components 222 identified in the manufacturing planning data 126.

In particular, the model 206, the first part 208, the second part 210, and the fourth part 214 are identified in the manufacturing planning data 126. In other words, the model 206, the first part 208, the second part 210, and the fourth part 214 are identified in the manufacturing plan for manufacturing for the vehicle structure 105.

When comparing the design data 124 and the manufacturing planning data 126, the object manager 110 may determine that the second part 210 is identified in the manufacturing plan as assembled. For example, the second part 210 may have been received from a supplier of the second part 210 in an assembled form and ready for use.

The object manager 110 assumes that any parts used in the assembly of the second part 210 are present when the second part 210 is received in the assembled form. In other words, when comparing the design data 124 and the manufacturing planning data 126, the object manager 110 assumes that the third part 212 is present in the manufacturing planning data 126. In this manner, the third part 212 does not need to be specifically identified in the manufacturing planning data 126.

Further, the object manager 110 also determines that the fourth part 214 is identified in the manufacturing planning data 126 in an assembled form. As a result, the object manager 110 assumes that the fifth part 216 and the sixth part 218 are present in the manufacturing planning data 126. The fifth part 216 and the sixth part 218 do not need to be specifically identified in the manufacturing planning data 126.

In this manner, the object manager 110 uses the comparison between the design data 124 and the manufacturing planning data 126 to determine that no differences are present between these two data sets. When no differences are present between two data sets, these data sets are fully matched or fully reconciled.

The object manager 110 then displays match indicators 230, 232, 234, 236, 238, 240, and 242 to indicate that the components 204 in the design data 124 have been matched with the components 222 in the manufacturing planning data 126. The match indicators 236, 240, and 242 next to the third part 212, the fifth part 216, and the sixth part 218, respectively, are up arrows. These up arrows indicate that these parts were identified in the manufacturing planning data 126 based on their respective parent parts being identified in the manufacturing planning data 126.

In particular, the match indicator 236 next to the third part 212 indicates that the third part 212 has been identified in the manufacturing planning data 126 based on the second part 210 being identified in the manufacturing planning data 126. Further, the match indicator 240 next to the fifth part 216 and the match indicator 242 next to the sixth part 218 indicate that these parts have been identified in the manufacturing planning data 126 based on the fourth part 214 being identified in the manufacturing planning data 126.

Further, indicator 244 indicates that all of the components 222 identified in the manufacturing planning data 126 are identified in the design data 124 and that all of the components 204 identified in the design data 124 are identified in the manufacturing planning data 126. In a similar manner, the object manager 110 may compare the design data 124 and the as-built data 128. The object manager 110 also determines that no differences are present between the design data 124 and the as-built data 128, as indicated by indicator 246.

In this manner, the object manager 110 reconciles the design data 124, the manufacturing planning data 126, and the as-built data 128. In this illustrative example, this reconciliation ensures that the design configuration 205, the manufacturing plan configuration 223, and the as-built configuration 227 substantially match as desired.

Figure 3:
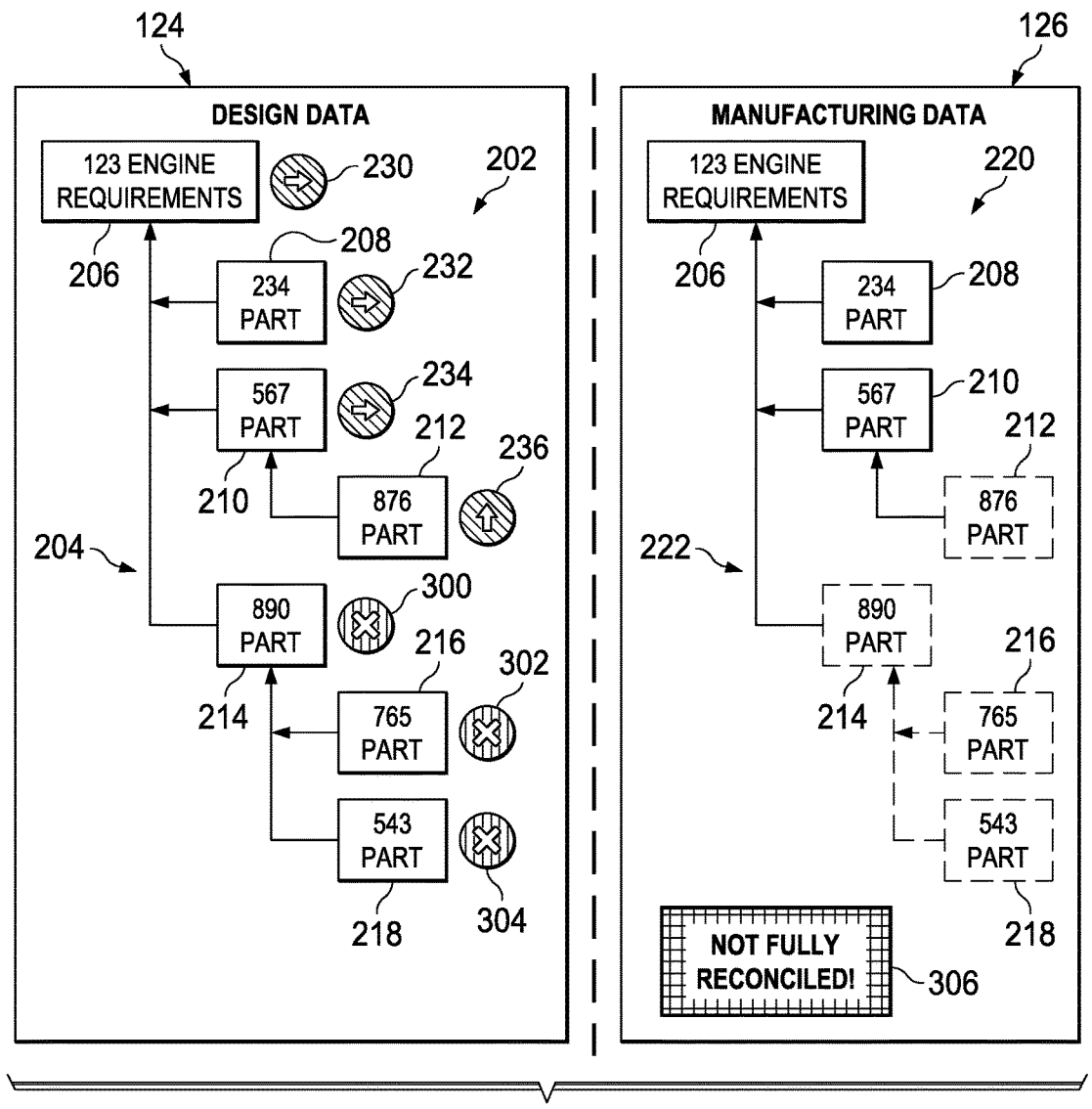
FIG. 3 is an illustration of a difference between data sets in accordance with an advantageous embodiment.

With reference now to FIG. 3, an illustration of a difference between data sets is depicted in accordance with an advantageous embodiment. In this illustrative example, the object manager 110 in FIG. 1 compares the design data 124 and the manufacturing planning data 126 and determines that a difference is present between these two data sets.

For example, this comparison may be performed at a time prior to the comparison performed between the design data 124 and the manufacturing planning data 126 in FIG. 2, when no differences are present between these data sets. In particular, the comparison between the design data 124 and the manufacturing planning data 126 in FIG. 3 is performed when the fourth part 214 has not yet been received from the supplier and added to the manufacturing plan for manufacturing the vehicle structure 105 in FIG. 1.

As a result, the object manager 110 changes the match indicators 238, 240, and 242 displayed for the fourth part 214, the fifth part 216, and the sixth part 218, respectively, in FIG. 2 to difference indicators 300, 302, and 304, respectively.

As depicted, these difference indicators 300, 302, and 304 indicate that the fourth part 214, the fifth part 216, and the sixth part 218, respectively, have not yet been identified in the manufacturing planning data 126. Further, another indicator 306 is displayed for the manufacturing planning data 126 instead of the indicator 244 in FIG. 2. This indicator 306 indicates that the manufacturing planning data 126 has not yet been reconciled or matched with the design data 124.

In other words, not all of the components 204 identified in the design data 124 are identified in the manufacturing planning data 126. As a result, the object manager 110 may determine that the design configuration 205 does not match the manufacturing plan configuration 223 for the vehicle structure 105.

With reference now to FIG. 4, an illustration of a data set is depicted in accordance with an advantageous embodiment. In this illustrative example, an example of one of data sets 114 from FIG. 1 is depicted. In particular, an example of one implementation for the design data 124 from FIG. 1 is depicted. As depicted, the design data 124 is represented in a first table 400.

In this illustrative example, the design data 124 is an empty data set. In other words, the first table 400 representing the design data 124 has not yet been populated with information for any components 402. The components 402 that will be identified in the design data 124 are the components for forming the object 104 from FIG. 1. In particular, the first table 400 has not yet been populated with information for attributes 404 for any components 402. This information may be added to the first table 400 during a design phase 118 for the object 104 to be formed by the components 402.

The attributes 404 include a part number 408, a location index 410, a vendor part number 412, a material 414, a weight 416, a drawing number 418, an installation side 420, and a maximum storage temperature 422. In this illustrative example, the part number 408 for a part is an identifier given to the part by the manufacturer who uses the part to form the object 104. The location index 410 for a part identifies a location for the part with respect to the configuration 117 for the object 104. For example, the location index 410 may identify an installation location for the part with respect to the object 104.

The vendor part number 412 is an identifier given to a part by the supplier of that part. The material 414 for a part may be the primary material from which the part is formed. The weight 416 of the part may be described in units such as, for example, without limitation, kilograms (kg). The drawing number 418 for a part is an identifier for the part used in a design for the object 104. The installation side 420 for a part is the side of the configuration 117 for the object 104 at which the part is to be installed. The maximum storage temperature 420 for a part is a maximum temperature for an environment in which the part is stored. The maximum storage temperature 420 may be described in units, such as, for example, without limitation, degrees Fahrenheit.

In this illustrative example, the part number 408 and the location index 410 for a component form a unique key 424 for that component. For example, the part number 408 is an example of a component identifier 137 from FIG. 1. The location index 410 is an example of instance identifier 139 from FIG. 1.

In the illustrative examples, the unique key 424 is different for each of the components 402 to be identified in the design table 400. For example, a first part and a second part may have the same part number 408, but the location index 410 may be different for these two components. In this manner, the location index 410 in the unique key 424 allows the different components 402 to be identified in the design data 124 to be distinguished from each other.

With reference now to FIG. 5, an illustration of a data set is depicted in accordance with an advantageous embodiment. In this illustrative example, an example of one of data sets 114 from FIG. 1 is depicted. In particular, an example of one implementation for the as-built data 128 from FIG. 1 is depicted. As depicted, the as-built data 128 is represented in a second table 500.

In this illustrative example, the as-built data 128 is an empty data set. In other words, the second table 500 representing the as-built data 128 has not yet been populated with information for any components 502. In particular, the second table 500 has not yet been populated with an identification of components 502 and/or information for attributes 504 for these components 502. The components 502 to be identified in the as-built data 128 are the components that are being assembled to form the object 104. The second table 520 is populated with information during a manufacturing phase 123 for the object 104.

The attributes 504 for these components 502 include a part number 508, a location index 510, an installation tool 512, a certification required indication 514, a storage location 516, an assembly jig number 518, an installation side 520, and an assembly cell 522. The part number 508 and the location index 510 for a part form a unique key 524 for the part, similar to the unique key 424 identified in the design data 124 in FIG. 4. In other words, the unique key 524 is of the same type as the unique key 424 in FIG. 4.

The installation tool 512 for a part is the tool used for installing the part to form the object 104. The certification required indication 514 for a part indicates whether the part requires a certification. The storage location 516 for a part is the location in which the part is stored. The assembly jig number 518 for a part is an identifier for an assembly jig for the part. The assembly cell 522 for a part may be a location in a manufacturing facility in which the part is installed in an assembly for the object.

With reference now to FIG. 6, an illustration of a comparison between two data sets is depicted in accordance with an advantageous embodiment. In this illustrative example, the first table 400 from FIG. 4 and the second table 500 from FIG. 5 have been populated with information. In particular, the design data 124 in the first table 400 identifies a first part 600 and a second part 602 as the components 402 for the object 104 as specified by a design of the object 104. The as-built data 128 in the second table 500 identifies a third part 604 for the object 104.

In this illustrative example, the first part 600 and the second part 602 have the same part number 408. However, the location index 410 for the first part 600 is different from the location index 410 for the second part 602. In this manner, the unique key 424 for the first part 600 and the unique key 424 for the second part 602 allows these parts to be distinguished from each other even when they have the same part number 408. Further, this unique key 424 is common to the as-built data 128. In other words, the unique key 424 used for the components 402 identified in the design data 124 is the same type of unique key 524 used for the components 502 identified in the as-built data 128.

The object manager 110 from FIG. 1 may be used to form a comparison 132 between the as-built data 128 represented in second table 500 and the design data 124 represented in first table 400 in FIG. 4 to ensure that the configuration 117 for the object 104 being manufactured is a correct configuration as specified by the design data 124. The comparison 132 is formed by matching the unique key 424 for each of the components 402 identified in the design data 124 with the unique key 524 for each of the components 502 identified in the as-built data 128.

For example, when the comparison 132 is formed, a match 606 is identified between the unique key 424 for the first part 600 identified in the design data 124 and the unique key 524 for the third part 604 identified in the as-built data 128. However, no match is found between the unique key 424 for the second part 602 identified in the design data 124 and the unique key 524 for any of the components 502 identified in the as-built data 128.

This mismatch indicates an underage for the configuration 117 of the object 104 with respect to the design data 124. In other words, fewer parts than needed as specified by the design data 124 have been assembled for the object 104. In response to this difference, an operator may determine whether the difference is the result of an error in the design data 124 and/or the as-built data 128 or the difference has an acceptable explanation. The operator may provide a disposition for this difference by providing the explanation.

Figure 7:
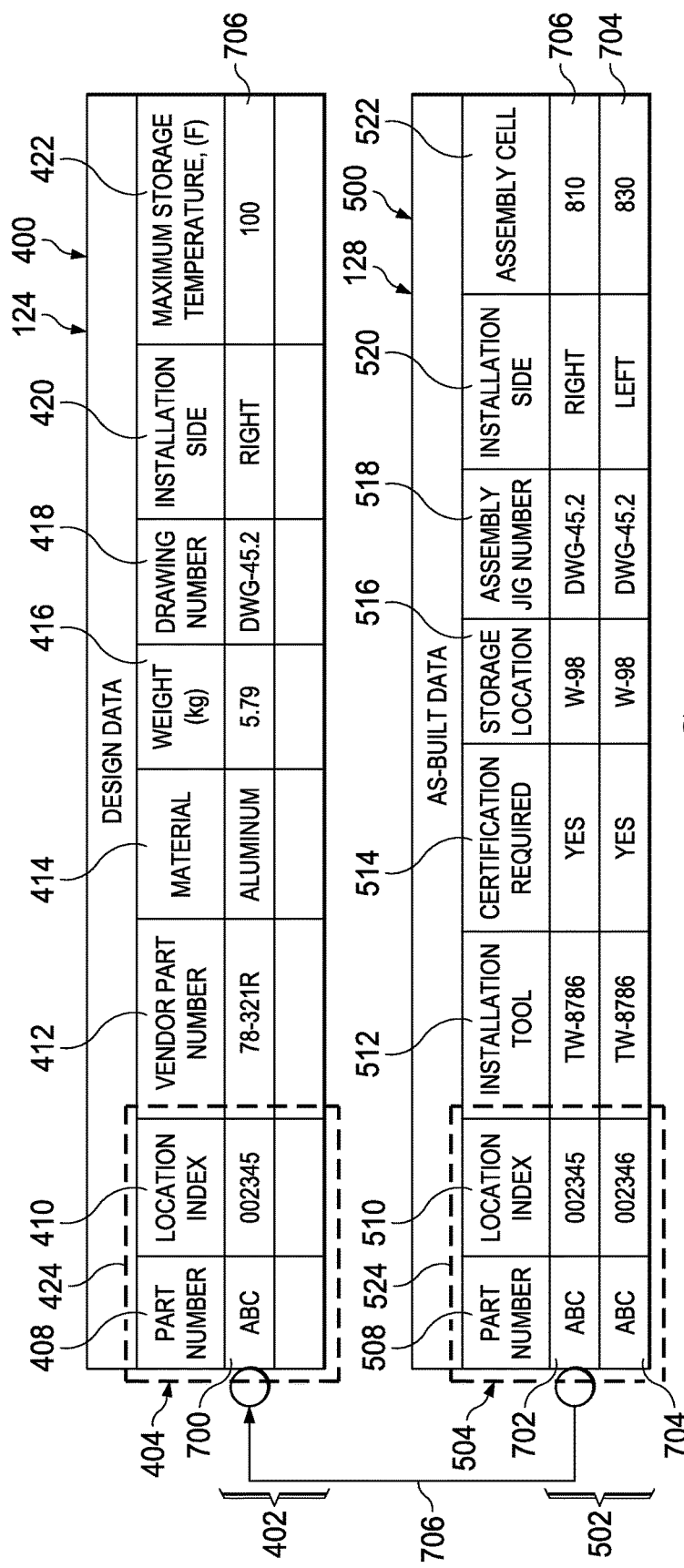
FIG. 7 is an illustration of a comparison between two data sets in accordance with an advantageous embodiment.

With reference now to FIG. 7, an illustration of a comparison between two data sets is depicted in accordance with an advantageous embodiment. In this illustrative example, the first table 400 from FIG. 4 and the second table 500 from FIG. 5 have been populated with information. In particular, the design data 124 in the first table 400 identifies a first part 700 as a component in components 402 for the object 104 as specified by a design of the object 104. The as-built data 128 in the second table 500 identifies a second part 702 and a third part 704 for the object 104.

The object manager 110 from FIG. 1 may be used to form a comparison 132 between the as-built data 128 represented in second table 500 and the design data 124 represented in first table 400 in FIG. 4 to ensure that the configuration 117 for the object 104 being manufactured is a correct configuration as specified by the design data 124.

For example, when the comparison 132 is formed, a match 706 is identified between the unique key 424 for the first part 700 identified in the design data 124 and the unique key 524 for the second part 702 identified in the as-built data 128. However, no match is found between the unique key 524 for the third part 704 identified in the as-built data 128 and the unique key 424 for any of the components 402 identified in the design data 124.

This mismatch indicates an overage for the configuration 117 of the object 104 with respect to the design data 124. In other words, more parts than needed as specified by the design data 124 have been assembled to form the object 104. Further, in response to this difference, an operator may determine whether the difference is the result of an error in the design data 124 and/or the as-built data 128 or the difference has an acceptable explanation. The operator may provide a disposition for this difference by providing the explanation.

Figure 8:
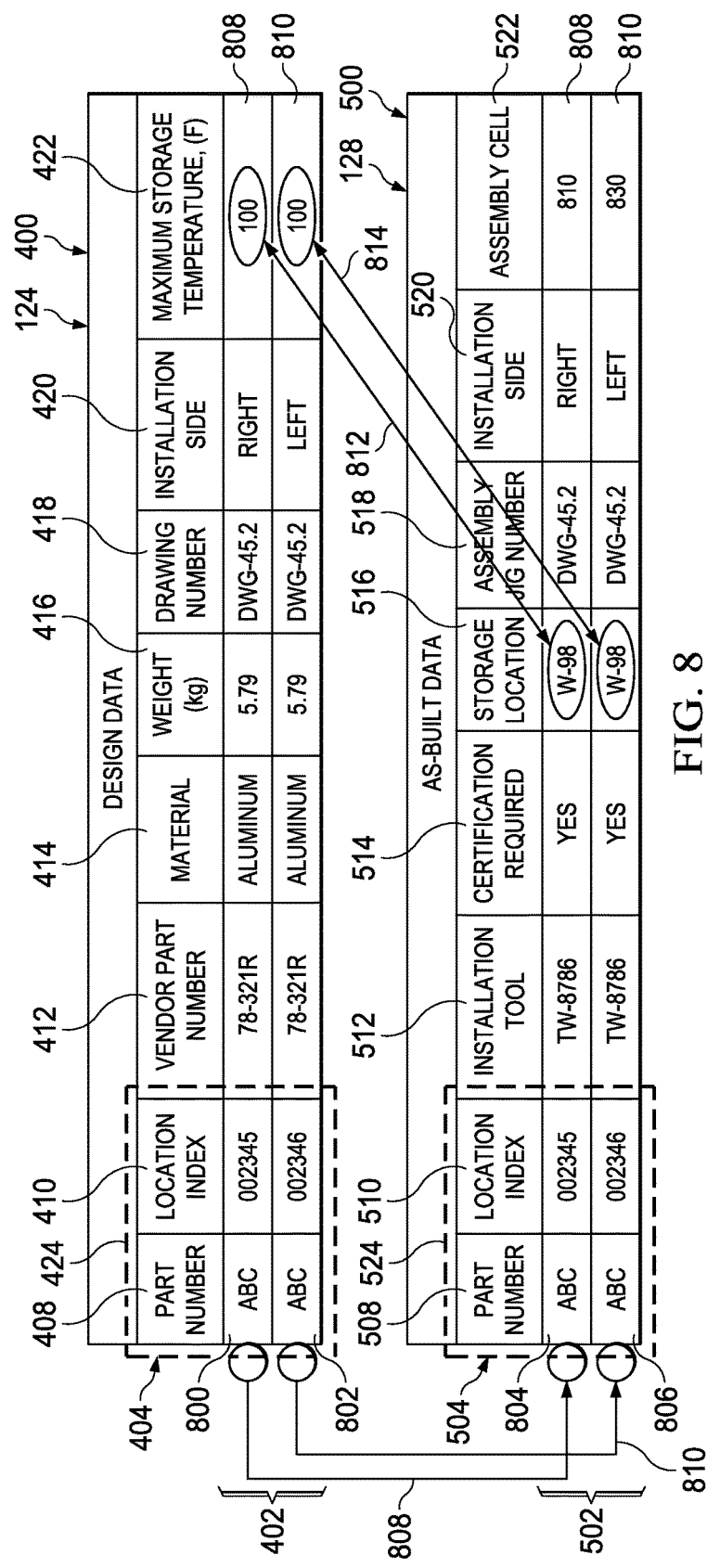
FIG. 8 is an illustration of a comparison between two data sets in accordance with an advantageous embodiment.

With reference now to FIG. 8, an illustration of a comparison between two data sets is depicted in accordance with an advantageous embodiment. In this illustrative example, the first table 400 from FIG. 4 and the second table 500 from FIG. 5 have been populated with information. In particular, the design data 124 in the first table 400 identifies a first part 800 and a second part 802 as the components 402 for the object 104. The as-built data 128 in the second table 500 identifies a third part 804 and a fourth part 806 for the object 104.

The object manager 110 from FIG. 1 may form a comparison 132 between these two data sets. This comparison 132 may indicate that the components 402 identified in the design data 124 match the components 502 identified in the as-built data 128. In particular, a match 808 is found between the unique key 424 for the first part 800 identified in the design data 124 and the unique key 524 for the third part 804 identified in the as-built data 128. Further, a match 810 is found between the unique key 424 for the second part 802 identified in the design data 124 and the unique key 524 for the fourth part 806 identified in the as-built data 128

However, when forming the comparison 132 between the two data sets, the object manager 110 may use a policy 133 to determine whether any difference is present between the two data sets. For example, the policy 133 may indicate that a component identified for the object 104 in the manufacturing phase 122 may need to be stored in a storage location 516 in which a temperature of the storage location 516 does not exceed a maximum storage temperature 422 for the particular component. The policy 133 may also include, for example, a list of storage locations and the maximum temperatures reaches at those storage locations.

In one illustrative example, the policy 133 may indicate that the storage location, W-98, reaches a maximum temperature greater than about 100 degrees Fahrenheit. As a result, the object manager 110 identifies difference 812 between the information provided for the first part 800 in the design data 124 and the information provided for the third part 804 in the as-built data 128 using the policy 133. Further the object manager 110 identifies difference 814 between the information provided for the second part 802 in the design data 124 and the information provided for the fourth part 806 in the as-built data 128 using the policy 133. These differences may be referred to as discrepancies or inconsistencies in the information for the attributes provided by the two data sets.

Figure 9:
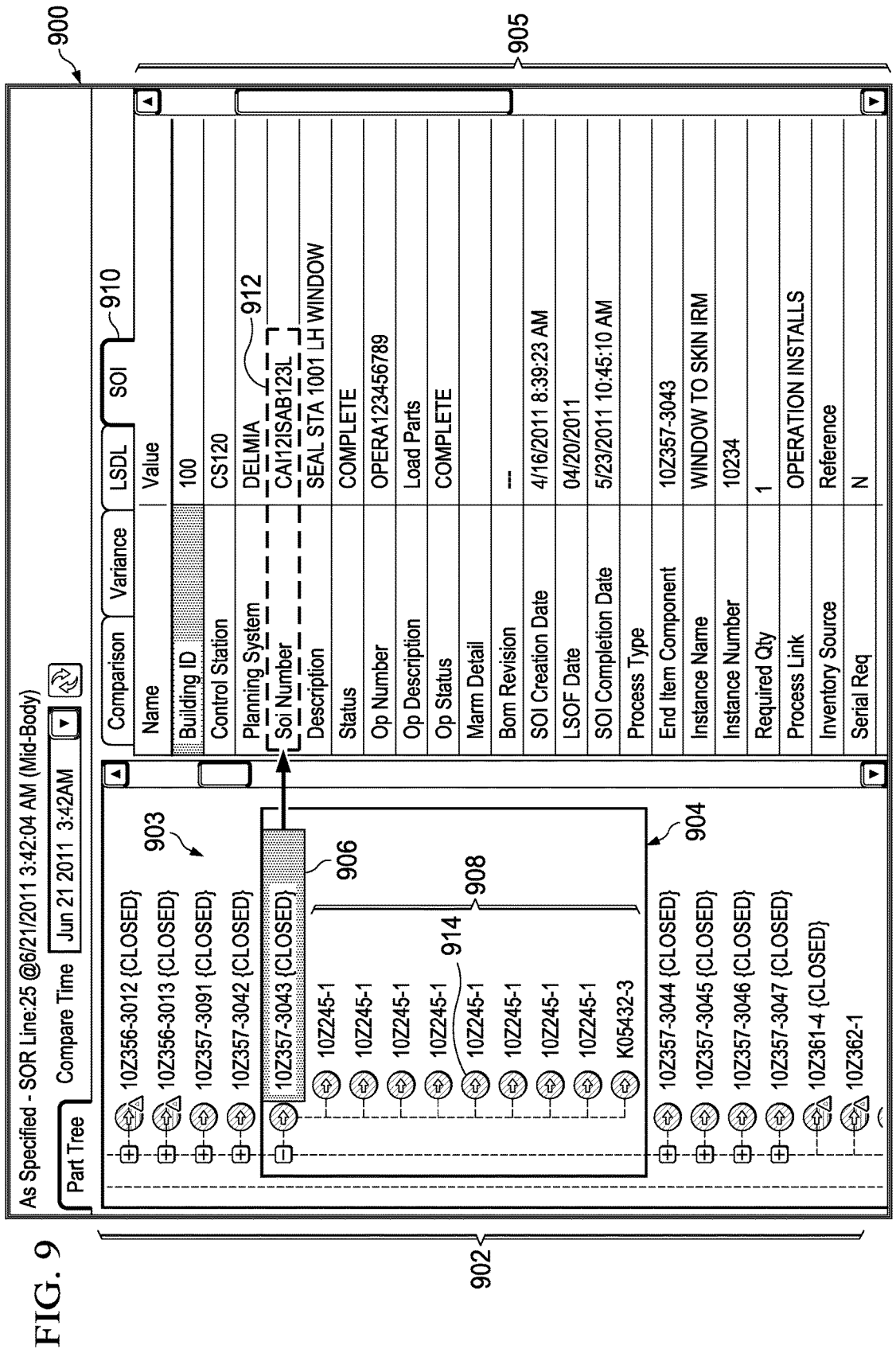
FIG. 9 is an illustration of a graphical user interface displaying results of a comparison between two data sets in accordance with an advantageous embodiment.

With reference now to FIG. 9, an illustration of a graphical user interface displaying results of a comparison between two data sets is depicted in accordance with an advantageous embodiment. In this illustrative example, a graphical user interface 900 may be displayed on the display system 140 from FIG. 1. The graphical user interface 900 displays the results for a comparison between design data, such as design data 124 in FIG. 1, and manufacturing planning data, such as manufacturing planning data 126 in FIG. 1.

In particular, the graphical user interface 900 displays a tree diagram 902 identifying components 903. The portion of the tree diagram 902 displayed in the graphical user interface 900 may identify the components 903 identified from the design data 124. In this illustrative example, a portion 904 of the tree diagram 902 is shown in an exploded view of the tree diagram 902 for an assembly 906. The assembly 906 comprises a plurality of parts 908.

Further, an information section 905 is also displayed in the graphical user interface 900. This information section 905 displays the results of the comparison between the two data sets, as well as other suitable information.

A particular part in the components 903 identified in the tree diagram 902 may be matched to the manufacturing planning data 126 when, for example, a shop order instance (SOI) is present for the particular part. The presence of a shop order instance indicates that the particular part has been identified in the manufacturing plan and that an order for the particular part has been placed with the supplier.

In this illustrative example, the assembly 906 has been selected in the tree diagram 902 for the design data 124. In response to this selection, information about the assembly 906 is displayed in the information section 905. Further, a shop order instance tab 910 is also displayed in the information section 905. The presence of the shop order instance tab 910 indicates that the assembly 906 is also identified in the manufacturing planning data 126. In particular, a shop order number 912 for the assembly 906 is displayed under the shop order instance tab 910.

Further, as indicated, match indicators 914 displayed next to the assembly 906 and the parts 908 that form the assembly 906 indicate that no differences are found between the design data 124 and the manufacturing planning data 126 with respect to the assembly and the plurality of parts 908. In other words, the match indicators 914 indicate that the assembly 906 and all of the parts 908 that form the assembly 906 have been identified in the manufacturing planning data 126.

Figure 10:
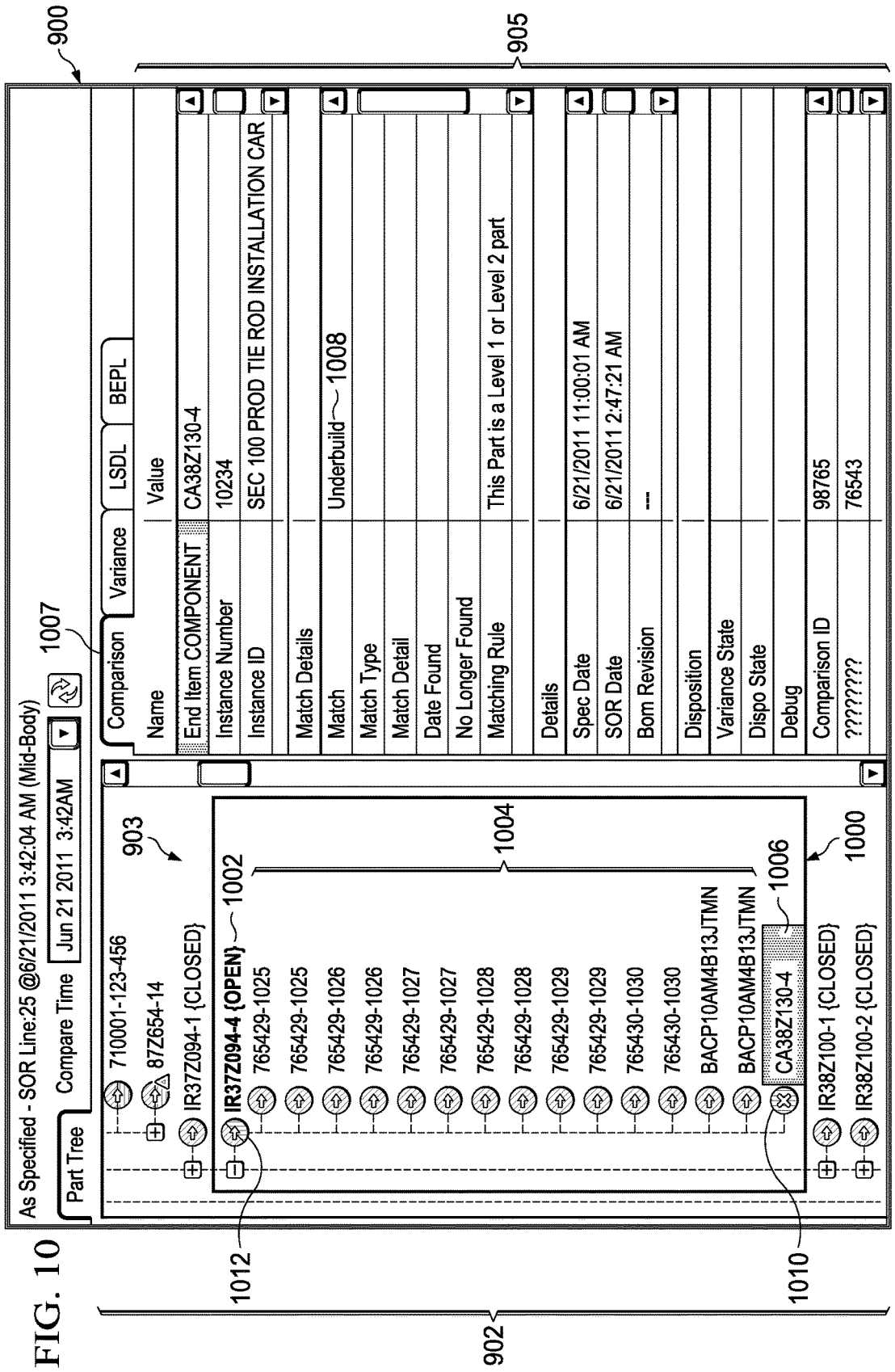
FIG. 10 is an illustration of a graphical user interface displaying results of another comparison between two data sets in accordance with an advantageous embodiment.

With reference now to FIG. 10, an illustration of a graphical user interface displaying results of another comparison between two data sets is depicted in accordance with an advantageous embodiment. In this illustrative example, a different portion 1000 of the tree diagram 902 is displayed on the graphical user interface 1000. This portion 1000 is for an assembly 1002 that includes a plurality of parts 1004.

In this illustrative example, a part 1006 in the parts 1004 for the assembly 1002 has been selected. In response to this selection, information for the part 1006 is displayed in the information section 905 on the graphical user interface 900. When a difference is present between the design data 124 and the manufacturing planning data 126, an indication of this difference is displayed under a comparison tab 1007 in the information section 905.

In this illustrative example, an underage indication 1008 is displayed under the comparison tab 1007. This underage indication 1008 indicates that the part 1006 identified in the tree diagram 902 for the design data 124 has not been identified in the manufacturing planning data 126. This underage is also indicated by the absence of a shop order instance tab, such as the shop order instance tab 910 displayed on the graphical user interface 900 in FIG. 9.

This underage is further indicated by a difference indicator 1010 next to the part 1006 in the tree diagram 902. A partial match indicator 1012 is displayed next to the assembly 1002 to indicate that not all of the parts 1004 for the assembly 1002 have been identified in the manufacturing planning data 126.

Figure 11:
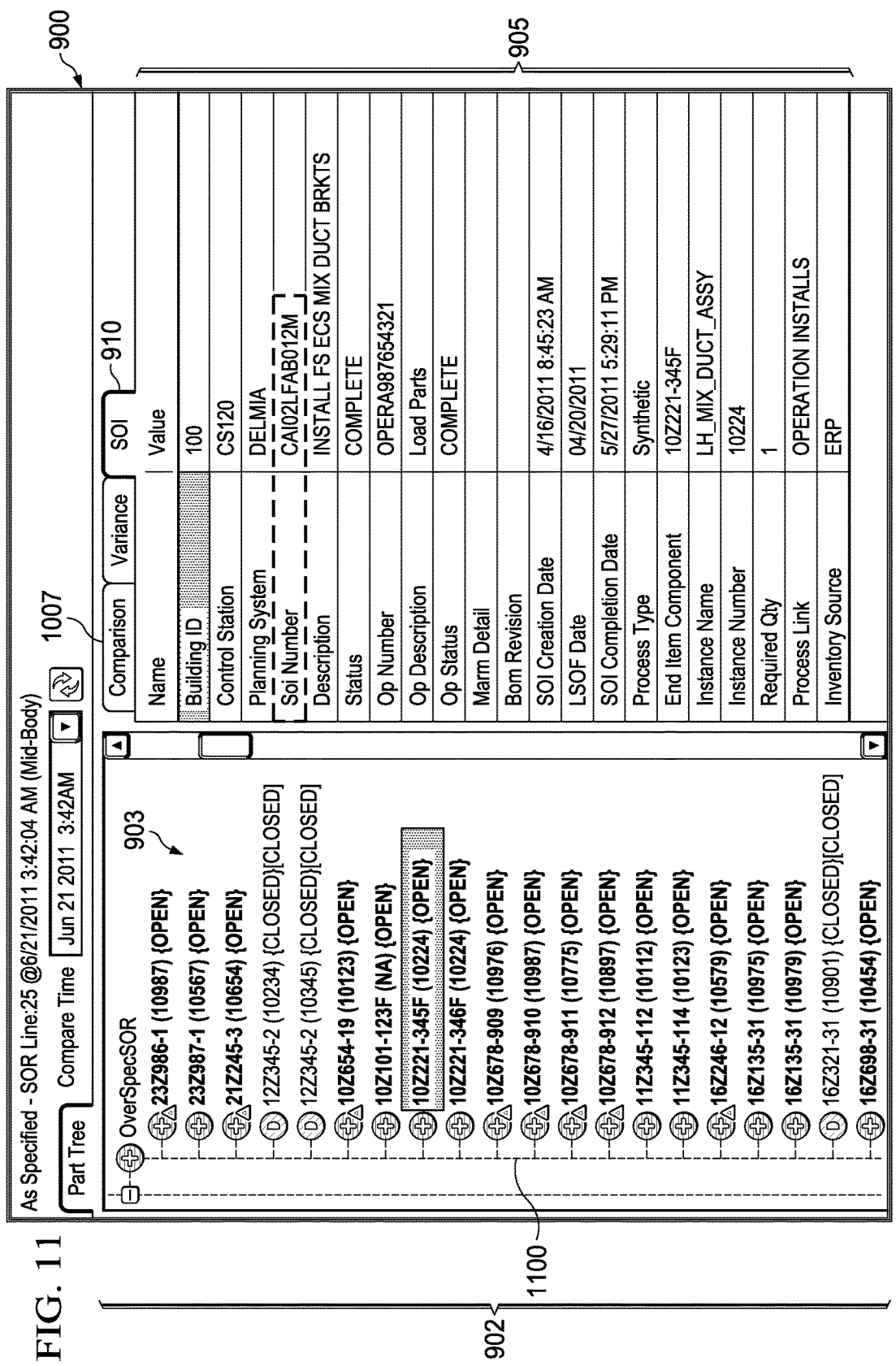
FIG. 11 is an illustration of a graphical user interface displaying results of a comparison between two data sets in accordance with an advantageous embodiment.

With reference now to FIG. 11, an illustration of a graphical user interface displaying results of a comparison between two data sets is depicted in accordance with an advantageous embodiment. In this illustrative example, the portion of the tree diagram 902 displayed on the graphical user interface 900 shows the components 903 that were identified in the manufacturing planning data 126 but not identified in the design data 124 in FIG. 1.

In this illustrative example, information may be displayed under the shop order instance tab 910 in the information section 905 for a component identified in the manufacturing planning data 126. Indicators 1100 next to the components 903 identified in the tree diagram 902, in this illustrative example, indicate that these components 903 have been identified in the manufacturing planning data 126 but not in the design data 124.

Figure 12:
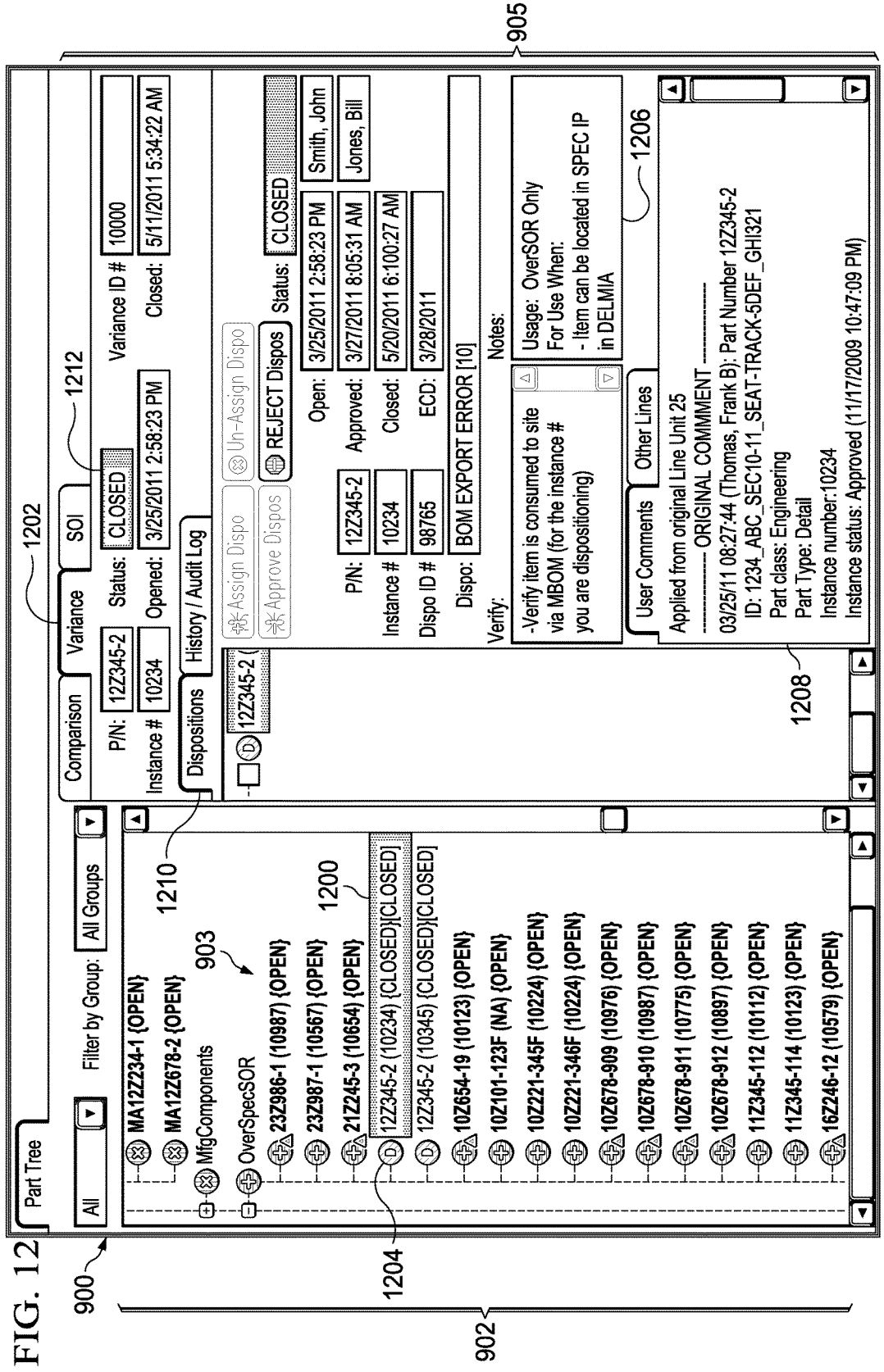
FIG. 12 is an illustration of a graphical user interface displaying results of a comparison between two data sets in accordance with an advantageous embodiment.

With reference now to FIG. 12, an illustration of a graphical user interface displaying results of a comparison between two data sets is depicted in accordance with an advantageous embodiment. In this illustrative example, a part 1200 has been selected from the components 903 identified in the tree diagram 902. In response to this selection, information for the part 1200 is displayed under a variance tab 1202 in the information section 905.

When a difference is identified, an operator may determine whether the difference is an error. If the difference is an error, the operator may enter user input through the graphical user interface 900 that allows the operator to correct the error.

Information about this correction may be entered in a notes section 1206 and/or a user comments section 1208 under a dispositions tab 1210 under the variance tab 1202. Further, when the difference is not an error, the operator may enter an explanation for the difference in the notes section 1206 and/or the user comments section 1208.

As depicted in this example, a closed indicator 1204 next to the part 1200 indicates that a difference that was previously present between the design data 124 and the manufacturing planning data 126 in FIG. 1 has now been resolved. In other words, an explanation for the difference was entered in the notes section 1206 and the user comments section 1208. Further, a status 1212 of this difference has been identified as closed. In other illustrative examples, when the difference has not yet been resolved, the status 1212 of the difference may be identified as open.

Figure 13:
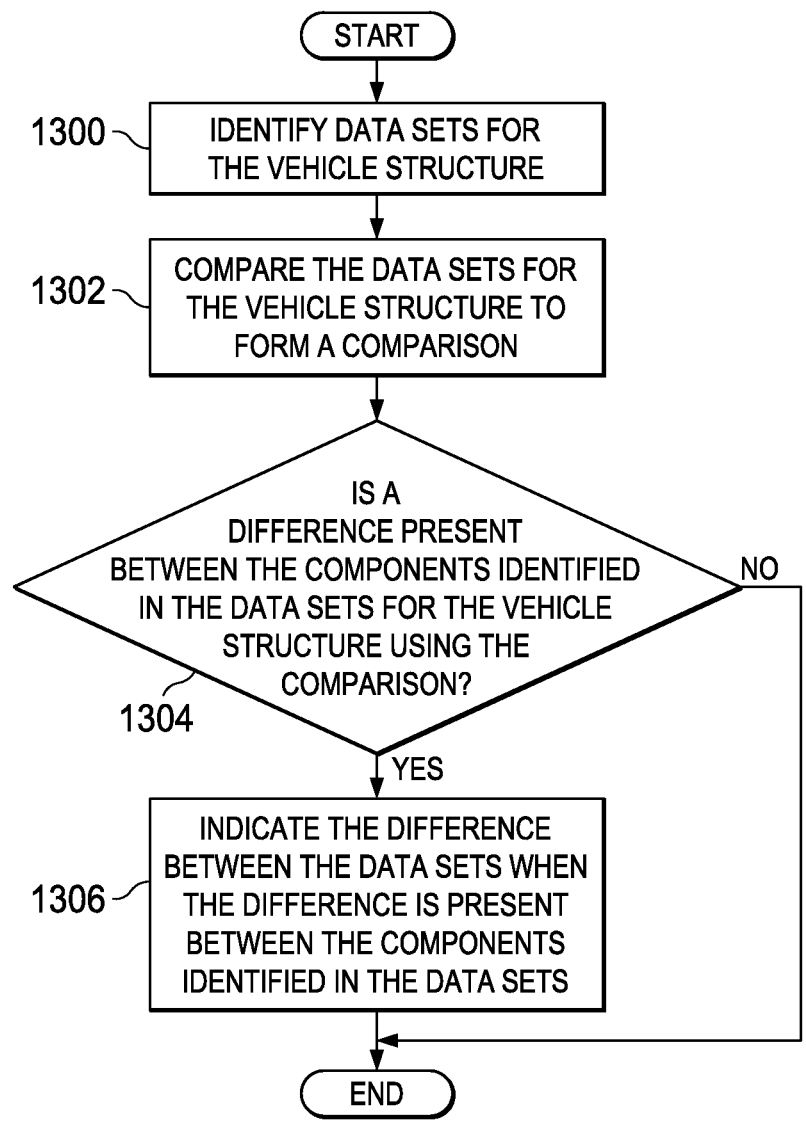
FIG. 13 is an illustration of a flowchart of a process for identifying parts in a vehicle in accordance with an advantageous embodiment.

With reference now to FIG. 13, an illustration of a flowchart of a process for identifying parts in a vehicle is depicted in accordance with an advantageous embodiment. The process illustrated in FIG. 13 may be implemented using the object manager 110 in FIG. 1.

The process begins by identifying data sets for the vehicle structure (operation 1300). Each data set identifies the components for the vehicle structure in a different phase in a lifecycle for the vehicle structure. In particular, each data set represents the configuration of the vehicle structure at a different phase in the lifecycle of the vehicle structure.

The process then compares the data sets for the vehicle structure (operation 1302). Next, the process identifies differences between the identifications of the components in the data sets (operation 1304). The operation 1304 may be performed by matching the unique keys for the different components in the different data sets.

Thereafter, the process establishes whether the differences between the identifications of the components in the data sets are errors (operation 1306). For example, a difference may be the result of an error during the entry of data.

The process then records error descriptions of established errors and difference descriptions of correct but different identifications of the components between the data sets (operation 1308). These error descriptions and difference descriptions are examples of the dispositions 144 in FIG. 1. In the operation 1308, when recorded, these error descriptions and difference descriptions are stored in a storage system, such as the storage system 113 in FIG. 3.

Next, the process corrects the errors in the respective data set of the data sets and annotates correct differences in one or more of the data sets to establish a corrected correlation between identifications of the components in the data sets (operation 1310), with the process terminating thereafter. In the operation 1310, the corrections and annotations may be made by, for example, the object manager 110 from FIG. 1 and/or an operator. For example, an operator may correct the differences that are the results of errors and make annotations providing explanations for the differences that are correct differences using a graphical user interface.

Figure 14:
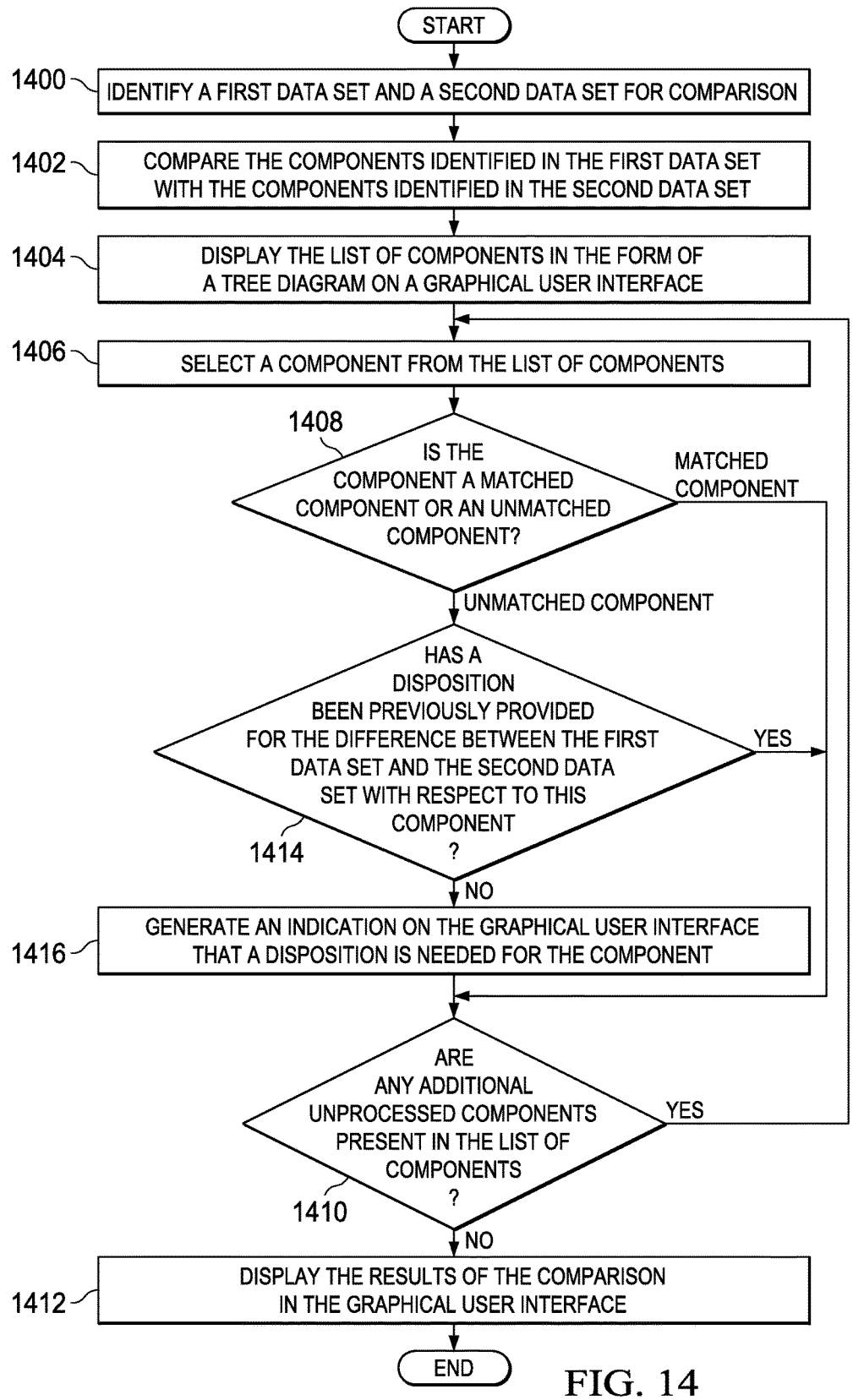
FIG. 14 is an illustration of a flowchart of a process for managing components used in developing a vehicle structure in accordance with an advantageous embodiment.

With reference now to FIG. 14, an illustration of a flowchart of a process for managing components used in a vehicle structure is depicted in accordance with an advantageous embodiment. The process illustrated in FIG. 14 may be implemented using, for example, the object manager 110 in FIG. 1.

The process begins by the object manager identifying a first data set and a second data set for comparison (operation 1400). The first data set may be, for example, the design data 124 in FIG. 1 or the manufacturing planning data 126 in FIG. 1. The second data set may be, for example, the manufacturing planning data 126 in FIG. 1 or the as-built data 128 in FIG. 1.

Next, the object manager compares the components identified in the first data set with the components identified in the second data set (operation 1402). In operation 1402, the components identified in the first data set and the components identified in the second data set are matched to form a list of components.

The components in this list of components may include matched components and/or unmatched components. In this illustrative example, a matched component is a component that is identified in both the first data set and the second data set. An unmatched component is a component that is identified in only one of these two data sets.

The object manager displays the list of components in the form of a tree diagram on a graphical user interface (operation 1404). Next, the object manager selects a component from the list of components (operation 1406).

The object manager then determines whether the component is a matched component or an unmatched component (operation 1408). If the component is a matched component, the object manager determines whether any additional unprocessed components are present in the list of components (operation 1410).

If additional unprocessed components are not present in the list of components, the object manager displays the results of the comparison in the graphical user interface (operation 1412), with the process terminating thereafter. However, if additional unprocessed components are present in the list of components, the process returns to operation 1406 as described above.

With reference again to operation 1408, if the component is an unmatched component, the object manager determines whether a disposition has been previously provided for the difference between the first data set and the second data set with respect to this component (operation 1414). If a disposition has been previously provided, the process proceeds to operation 1410 as described above.

Otherwise, if a disposition has not been previously provided, the object manager generates an indication on the graphical user interface that a disposition is needed for the component (operation 1416). This indication may be, for example, a graphical indicator for display next to the component in the tree diagram. As another example, the indication may be text for display in a section under a tab on the graphical user interface that is displayed in response to a selection of the component in the tree diagram. Thereafter, the process returns to operation 1410 as described above.

In these illustrative examples, an operator may view the results of the comparison on the graphical user interface to enter new data. The new data may include, for example, explanations for differences identified between the components identified in the first data set and the second data set, new data correcting errors in the manufacturing of the vehicle structure, and/or other suitable data.

In these illustrative examples, the first data set and the second data set are considered fully matched or fully reconciled when no differences are present between the first data set and the second data set or when a disposition has been provided for any differences that have been identified between the two data sets.

Figure 15:
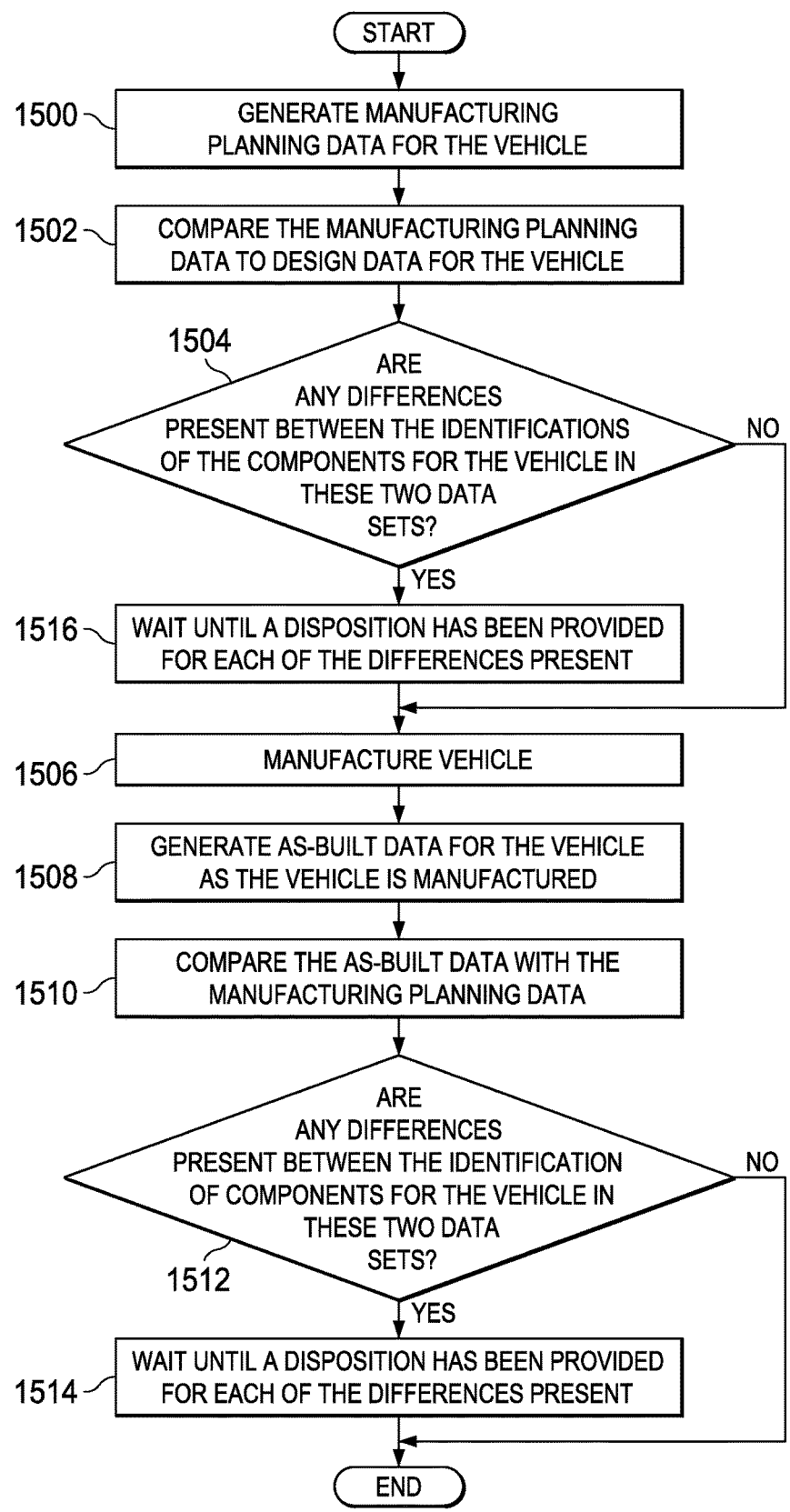
FIG. 15 is an illustration of a flowchart of a process for manufacturing a vehicle in accordance with an advantageous embodiment.

With reference now to FIG. 15, an illustration of a flowchart of a process for manufacturing a vehicle is depicted in accordance with an advantageous embodiment. The process illustrated in FIG. 15 may be implemented in manufacturing facility 142 in FIG. 1.

The process begins by generating manufacturing planning data for the vehicle (operation 1500). The manufacturing planning data for the vehicle includes identifications of components for the vehicle. These components may include, for example, physical parts, tools, instructions, software components, and/or other components that may be needed for manufacturing the vehicle.

The manufacturing planning data is compared to design data for the vehicle (operation 1502). The design data also includes identifications of components for the vehicle as specified in a design for the vehicle. The process determines whether any differences are present between the identifications of the components for the vehicle in these two data sets (operation 1504). If no differences are present, the vehicle is manufactured (operation 1506).

The process generates as-built data for the vehicle as the vehicle is manufactured (operation 1508). The as-built data for the vehicle includes identifications of the components in the assembled configuration for the vehicle. The process then compares the as-built data with the manufacturing planning data (operation 1510). The process determines whether any differences are present between the identification of components for the vehicle in these two data sets (operation 1512). If no differences are present, the process terminates.

Otherwise, if any differences are present, the process waits until a disposition has been provided for each of the differences present (operation 1514). A disposition is a resolution for a difference. For example, if the difference is an error, then the disposition may be a correction to that error. In some cases, the disposition may be an explanation for the difference indicating that the difference is acceptable. The disposition may be provided by user input entered by an operator, may be generated by an artificial intelligence system, or may be generated in some other suitable manner. Thereafter, the process terminates.

With reference again to operation 1504, if any differences are present, the process waits until a disposition has been provided for each of the differences present (operation 1516). The process then proceeds to operation 1506 as described above.

The flowcharts and block diagrams in the different depicted embodiments illustrate the architecture, functionality, and operation of some possible implementations of apparatus and methods in an advantageous embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an advantageous embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 16:
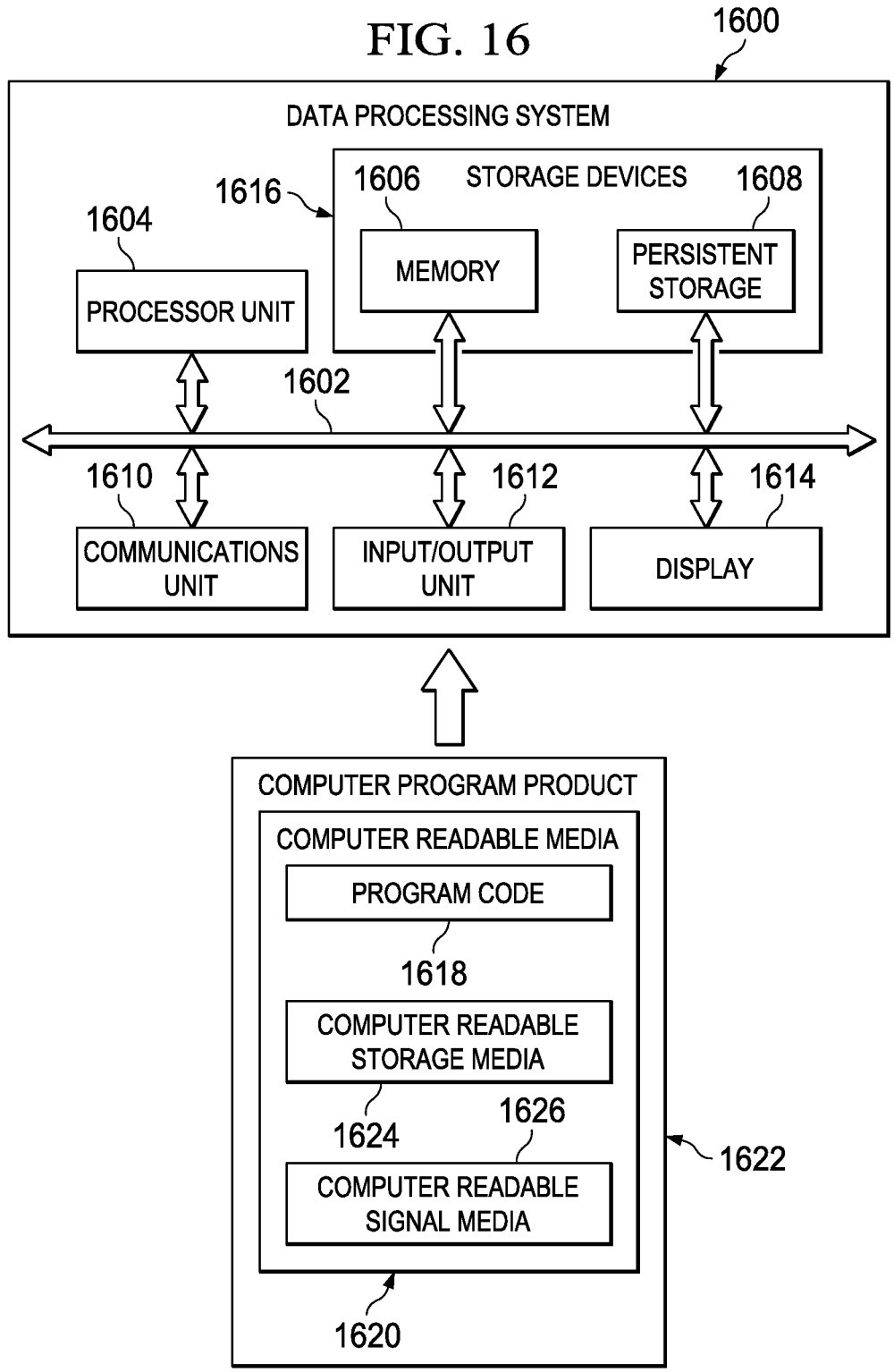
FIG. 16 is an illustration of a data processing system in accordance with an advantageous embodiment.

Turning now to FIG. 16, an illustration of a data processing system is depicted in accordance with an advantageous embodiment. Data processing system 1600 is an example of one implementation for one or more of computers 112 in FIG. 1. In this illustrative example, a data processing system 1600 includes a communications framework 1602, which provides communications between a processor unit 1604, memory 1606, persistent storage 1608, a communications unit 1610, an input/output (I/O) unit 1612, and a display 1614.

The processor unit 1604 serves to execute instructions for software that may be loaded into the memory 1606. The processor unit 1604 may be a number of processors, a multi-processor core, or some other type of processor, depending on the particular implementation. A number, as used herein with reference to an item, means one or more items. Further, the processor unit 1604 may be implemented using a number of heterogeneous processor systems in which a main processor is present with secondary processors on a single chip. As another illustrative example, the processor unit 1604 may be a symmetric multi-processor system containing multiple processors of the same type.

The memory 1606 and the persistent storage 1608 are examples of storage devices 1616. A storage device is any piece of hardware that is capable of storing information, such as, for example, without limitation, data, program code in functional form, and/or other suitable information either on a temporary basis and/or a permanent basis. The storage devices 1616 may also be referred to as computer readable storage devices in these examples. The memory 1606, in these examples, may be, for example, a random access memory or any other suitable volatile or non-volatile storage device. The persistent storage 1608 may take various forms, depending on the particular implementation.

For example, the persistent storage 1608 may contain one or more components or devices. For example, the persistent storage 1608 may be a hard drive, a flash memory, a rewritable optical disk, a rewritable magnetic tape, or some combination of the above. The media used by the persistent storage 1608 also may be removable. For example, a removable hard drive may be used for the persistent storage 1608.

The communications unit 1610, in these examples, provides for communications with other data processing systems or devices. In these examples, the communications unit 1610 is a network interface card. The communications unit 1610 may provide communications through the use of either or both physical and wireless communications links.

The input/output unit 1612 allows for input and output of data with other devices that may be connected to the data processing system 1600. For example, the input/output unit 1612 may provide a connection for user input through a keyboard, a mouse, and/or some other suitable input device. Further, the input/output unit 1612 may send output to a printer. The display 1614 provides a mechanism to display information to a user.

Instructions for the operating system, applications, and/or programs may be located in the storage devices 1616, which are in communication with the processor unit 1604 through the communications framework 1602. In these illustrative examples, the instructions are in a functional form on the persistent storage 1608. These instructions may be loaded into the memory 1606 for execution by the processor unit 1604. The processes of the different embodiments may be performed by the processor unit 1604 using computer-implemented instructions, which may be located in a memory, such as the memory 1606.

These instructions are referred to as program code, computer usable program code, or computer readable program code that may be read and executed by a processor in the processor unit 1604. The program code in the different embodiments may be embodied on different physical or computer readable storage media, such as the memory 1606 or the persistent storage 1608.

Program code 1618 is located in a functional form on computer readable media 1620 that is selectively removable and may be loaded onto or transferred to the data processing system 1600 for execution by the processor unit 1604. The program code 1618 and the computer readable media 1620 form a computer program product 1622 in these examples. In one example, the computer readable media 1620 may be computer readable storage media 1624 or computer readable signal media 1626. The computer readable storage media 1624 may include, for example, an optical or magnetic disk that is inserted or placed into a drive or other device that is part of the persistent storage 1608 for transfer onto a storage device, such as a hard drive, that is part of the persistent storage 1608. The computer readable storage media 1624 also may take the form of a persistent storage, such as a hard drive, a thumb drive, or a flash memory, that is connected to the data processing system 1600. In some instances, the computer readable storage media 1624 may not be removable from the data processing system 1600.

In these examples, the computer readable storage media 1624 is a physical or tangible storage device used to store the program code 1618 rather than a medium that propagates or transmits the program code 1618. The computer readable storage media 1624 is also referred to as a computer readable tangible storage device or a computer readable physical storage device. In other words, the computer readable storage media 1624 is a media that can be touched by a person.

Alternatively, the program code 1618 may be transferred to the data processing system 1600 using the computer readable signal media 1626. The computer readable signal media 1626 may be, for example, a propagated data signal containing the program code 1618. For example, the computer readable signal media 1626 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, the program code 1618 may be downloaded over a network to the persistent storage 1608 from another device or data processing system through the computer readable signal media 1626 for use within the data processing system 1600. For instance, program code stored in a computer readable storage medium in a server data processing system may be downloaded over a network from the server to the data processing system 1600. The data processing system providing the program code 1618 may be a server computer, a client computer, or some other device capable of storing and transmitting the program code 1618.

The different components illustrated for the data processing system 1600 are not meant to provide architectural limitations to the manner in which different embodiments may be implemented. The different advantageous embodiments may be implemented in a data processing system including components in addition to or in place of those illustrated for the data processing system 1600. Other components shown in FIG. 16 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 1604 may take the form of a hardware unit that has circuits that are manufactured or configured for a particular use. This type of hardware may perform operations without needing program code to be loaded into a memory from a storage device to be configured to perform the operations.

For example, when the processor unit 1604 takes the form of a hardware unit, the processor unit 1604 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, the program code 1618 may be omitted, because the processes for the different embodiments are implemented in a hardware unit.

In still another illustrative example, the processor unit 1604 may be implemented using a combination of processors found in computers and hardware units. The processor unit 1604 may have a number of hardware units and a number of processors that are configured to run the program code 1618. With this depicted example, some of the processes may be implemented in the number of hardware units, while other processes may be implemented in the number of processors.

In another example, a bus system may be used to implement the communications framework 1602 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, the memory 1606, or a cache, such as found in an interface and memory controller hub that may be present in the communications framework 1602.

Figure 17:
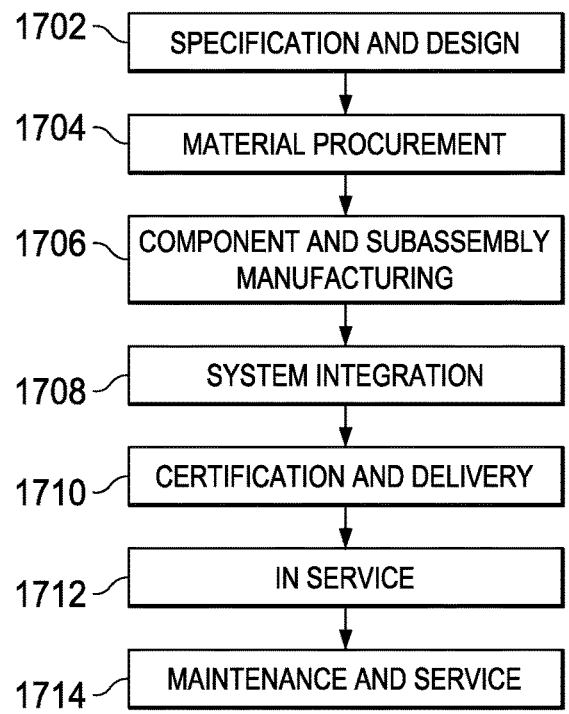
FIG. 17 is an illustration of an aircraft manufacturing and service method in accordance with an advantageous embodiment.
Figure 18:
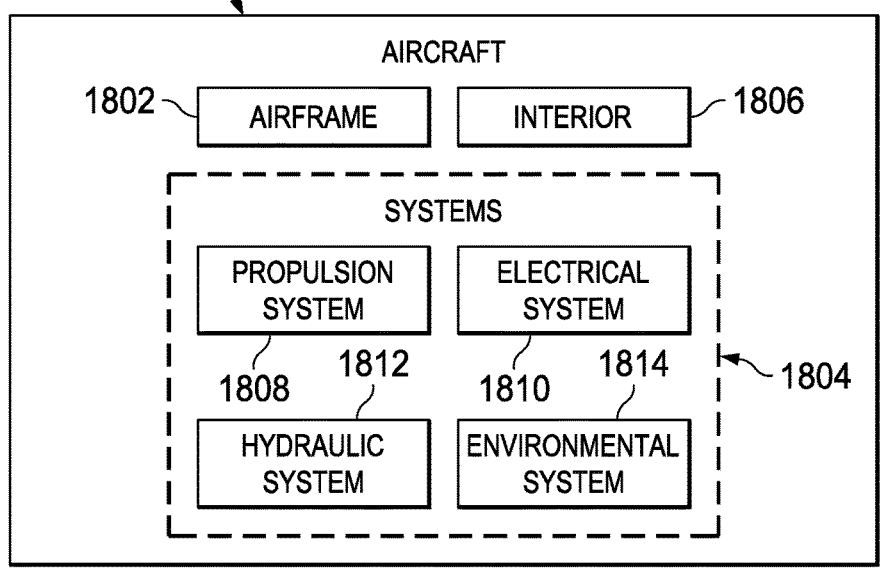
FIG. 18 is an illustration of an aircraft in which an advantageous embodiment may be implemented.

Advantageous embodiments of the disclosure may be described in the context of an aircraft manufacturing and service method 1700 as shown in FIG. 17 and an aircraft 1800 as shown in FIG. 18.

Turning first to FIG. 17, an illustration of an aircraft manufacturing and service method is depicted in accordance with an advantageous embodiment. During pre-production, the aircraft manufacturing and service method 1700 may include a specification and design 1702 of the aircraft 1800 in FIG. 18 and a material procurement 1704.

During production, component and subassembly manufacturing 1706 and system integration 1708 of the aircraft 1800 in FIG. 18 takes place. Thereafter, the aircraft 1800 in FIG. 18 may go through certification and delivery 1710 in order to be placed in service 1712. While in service 1712 by a customer, the aircraft 1800 in FIG. 18 is scheduled for routine maintenance and service 1714, which may include modification, reconfiguration, refurbishment, and other maintenance or service.

Each of the processes of the aircraft manufacturing and service method 1700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 18, an illustration of an aircraft is depicted in which an advantageous embodiment may be implemented. In this example, the aircraft 1800 is produced by the aircraft manufacturing and service method 1700 in FIG. 17 and may include an airframe 1802 with a plurality of systems 1804 and an interior 1806. Examples of the systems 1804 include one or more of a propulsion system 1808, an electrical system 1810, a hydraulic system 1812, and an environmental system 1814. Any number of other systems may be included. Although an aerospace example is shown, different advantageous embodiments may be applied to other industries, such as the automotive industry.

Apparatuses and methods embodied herein may be employed during at least one of the stages of the aircraft manufacturing and service method 1700 in FIG. 17.

In one illustrative example, components or subassemblies produced in the component and subassembly manufacturing 1706 in FIG. 17 may be fabricated or manufactured in a manner similar to components or subassemblies produced while the aircraft 1800 is in service 1712 in FIG. 17. As yet another example, one or more apparatus embodiments, method embodiments, or a combination thereof may be utilized during production stages, such as the component and subassembly manufacturing 1706 and the system integration 1708 in FIG. 17. One or more apparatus embodiments, method embodiments, or a combination thereof may be utilized while the aircraft 1800 is in service 1712 and/or during the maintenance and service 1714 in FIG. 17. The use of a number of the different advantageous embodiments may substantially expedite the assembly of and/or reduce the cost of the aircraft 1800.

Thus, the different advantageous embodiments provide a method and apparatus for managing a vehicle structure. In one advantageous embodiment, a method for managing a vehicle structure is provided. Data sets for managing the vehicle structure are identified. Each data set includes identifications of the components for the vehicle structure in a different phase in a lifecycle of the vehicle structure. A determination is made as to whether a difference is present between the identifications of the components in the data sets. The difference between the data sets is indicated when the difference is present between the identifications of the components in the data sets.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A build process comprising:
    generating, and storing in a storage device, a plurality of data sets that define a product during respective phases of a lifecycle of the product and identify components of the product by respective unique keys each of which includes a component identifier and an instance identifier, the plurality of data sets including (a) an engineering bill of materials generated during a design phase and defining the product as designed, (b) a sales bill of materials generated during a manufacturing planning phase and defining the product as ordered, and (c) manufacturing bills of material generated during a manufacturing phase and defining the product at respective stages of completion;
    designing a new configuration of the product during an additional, reconfiguration phase of the respective phases of the lifecycle of the product, the new configuration of the product including a change to at least one component of the product as designed;
    generating, and including in the plurality of data sets stored in the storage device, a further bill of materials defining the new configuration of the product; and repeatedly by a processor accessing the plurality of data sets from the storage device throughout the respective phases of the lifecycle of the product,
    determining any differences in the components of the product between phases of the respective phases, including any differences caused by a phase of the respective phases being incomplete, one or more components being unavailable or discontinued, a change to one or more components, or an error in a data set of the plurality of data sets, determining any differences including comparing different data sets of the plurality of data sets to identify any differences in the components of the product identified therein based on the respective unique keys, comparing the different data sets including at least:
        comparing the engineering bill of materials and the sales bill of materials during the manufacturing planning phase to identify any differences in components of the product as designed and as ordered;
        comparing the sales bill of materials and the manufacturing bills of materials throughout the manufacturing phase to identify any differences in components of the product as ordered and at the respective stages of completion; and
        comparing the engineering bill of materials and the further bill of materials during the reconfiguration phase to identify any differences in components of the product as designed and in the new configuration;
    accessing a policy with criteria for acceptable differences, and including criteria or requirements for changes to the product as designed;
    determining, from the policy for any differences so identified, whether the differences meet the criteria and are thereby acceptable differences, or the differences are errors, including determining whether the new configuration of the product meets the criteria or requirements; and
    generating a visual presentation of a data set of the different data sets for display in a graphical user interface, the visual presentation including components of the product identified in the data set, and for the components in the visual presentation, match indicators to indicate no differences in the components between the data set and another of the different data sets, and difference indicators to indicate any differences in the components between the data set and the other of the different data sets,
    wherein the visual presentation further includes an indicator that indicates the different data sets are reconciled in an instance in which no differences in the components are identified or the differences are acceptable differences, or that the different data sets are not reconciled in an instance in which the differences include at least one error.

2. The build process of claim 1, wherein the components of the product include individual parts and at least one assembly of parts, and the engineering bill of materials identifies the individual parts, the at least one assembly and the parts of the at least one assembly by respective unique keys,
    wherein the sales bill of materials identities the individual parts and the at least one assembly by respective unique keys but does not identify the parts of the at least one assembly, and
    wherein comparing the engineering bill of materials and the sales bill of materials assumes that the parts of the at least one assembly are present in the at least one assembly identified in the sales bill of materials, and identifies no differences based on the sales bill of materials not identifying the parts of the at least one assembly.

3. The build process of claim 1, wherein comparing the different data sets further includes comparing the engineering bill of materials and the manufacturing bills of materials throughout the manufacturing phase to identify any differences in components of the product as designed and at the respective stages of completion.

4. The build process of claim 3, wherein the components of the product include individual parts and at least one assembly of parts, and the engineering bill of materials identifies the individual parts, the at least one assembly and the parts of the at least one assembly by respective unique keys, wherein at least one of the manufacturing bills of materials identifies the individual parts and the at least one assembly by respective unique keys but does not identify the parts of the at least one assembly, and wherein comparing the engineering bill of materials and the at least one of the manufacturing bills of materials assumes that the parts of the at least one assembly are present in the at least one assembly identified in the at least one of the manufacturing bills of materials, and identifies no differences based on the at least one of the manufacturing bills of materials not identifying the parts of the at least one assembly.

5. The build process of claim 1, wherein comparing the different data sets includes:

comparing the respective unique keys in the different data sets for any unique keys in one of the different data sets that are not in another of the different data sets; and for each unique key that is in the one and the other of the different data sets, comparing information associated with the unique key for any differences between the one and the other of the different data sets.

6. The build process of claim 5, wherein the different data sets includes a first data set generated earlier than a second data set, and wherein comparing the respective unique keys includes identifying an overage of components in the second data set in an instance in which at least one unique key in the second data set is not in the first data set, or an underage of components in the second data set in an instance in which at least one unique key in the first data set is not in the second data set.

7. The build process of claim 1 further comprising in an instance in which differences are identified in the components of the product identified in the different data sets:

receiving dispositions for the differences to resolve and thereby render the differences unidentifiable;

recording the dispositions in the storage device with the different data sets;

comparing again the different data sets and including the dispositions such that the no differences in the components are identified; and generating again the visual presentation of the data set, the visual presentation including the indicator that indicates that the different data sets are reconciled.

8. The build process of claim 7, wherein receiving dispositions for the differences includes receiving an explanation for any of the differences that are acceptable differences.

9. The build process of claim 7, wherein receiving dispositions for the differences includes correcting any of the differences that are errors in at least one of the different data sets.

10. An apparatus comprising:

a storage device configured to store a plurality of data sets that define a product during respective phases of a lifecycle of the product and identify components of the product by respective unique keys each of which includes a component identifier and an instance identifier, the plurality of data sets including (a) an engineering bill of materials generated during a design phase and defining the product as designed, (b) a sales bill of materials generated during a manufacturing planning phase and defining the product as ordered, and (c) manufacturing bills of material generated during a manufacturing phase and defining the product at respective stages of completion; and a processor configured to receive a design of a new configuration of the product during an additional, reconfiguration phase of the respective phases of the lifecycle of the product, the new configuration of the product including a change to at least one component of the product as designed, and the plurality of data sets in the storage device including a further bill of materials defining the new configuration of the product, wherein the processor is also configured to determine any differences in the components of the product between phases of the respective phases, including any differences caused by a phase of the respective phases being incomplete, one or more components being unavailable or discontinued, a change to one or more components, or an error in a data set of the plurality of data sets, the processor being configured to determine any differences including being configured to access the plurality of data sets from the storage device throughout the respective phases of the lifecycle of the product, and programmed to repeatedly perform operations including at least:

comparing different data sets of the plurality of data sets to identify any differences in the components of the product identified therein based on the respective unique keys, comparing the different data sets including at least:

comparing the engineering bill of materials and the sales bill of materials during the manufacturing planning phase to identify any differences in components of the product as designed and as ordered;

comparing the sales bill of materials and the manufacturing bills of materials throughout the manufacturing phase to identify any differences in components of the product as ordered and at the respective stages of completion; and comparing the engineering bill of materials and the further bill of materials during the reconfiguration phase to identify any differences in components of the product as designed and in the new configuration;

accessing a policy with criteria for acceptable differences, and including criteria or requirements for changes to the product as designed;

determining, from the policy for any differences so identified, whether the differences meet the criteria and are thereby acceptable differences, or the differences are errors, including determining whether the new configuration of the product meets the criteria or requirements; and generating a visual presentation of a data set of the different data sets for display in a graphical user interface, the visual presentation including components of the product identified in the data set, and for the components in the visual presentation, match indicators to indicate no differences in the components between the data set and another of the different data sets, and difference indicators to indicate any differences in the components between the data set and the other of the different data sets, wherein the visual presentation further includes an indicator that indicates the different data sets are reconciled in an instance in which no differences in the components are identified or the differences are acceptable differences, or that the different data sets are not reconciled in an instance in which the differences include at least one error.

11. The apparatus of claim 10, wherein the components of the product include individual parts and at least one assembly of parts, and the engineering bill of materials identifies the individual parts, the at least one assembly and the parts of the at least one assembly by respective unique keys,
   wherein the sales bill of materials identifies the individual parts and the at least one assembly by respective unique keys hut does not identity the parts of the at least one assembly, and
   wherein comparing the engineering bill of materials and the sales bill of materials assumes that the parts of die at least one assembly are present in the at least one assembly identified in the sales bill of materials, and identifies no differences based on the sales bill of materials not identifying the parts of the at least one assembly.

12. The apparatus of claim 10, wherein comparing the different data sets further includes comparing the engineering bill of materials and the manufacturing bills of materials throughout the manufacturing phase to identify any differences in components of the product as designed and at the respective stages of completion.

13. The apparatus of claim 12, wherein the components of the product include individual parts and at least one assembly of parts, and the engineering bill of materials identifies the individual parts, the at least one assembly and the parts of the at least one assembly by respective unique keys,
   wherein at least one of the manufacturing bills of materials identifies the individual parts and the at least one assembly by respective unique keys but does not identify the parts of the at least one assembly, and
   wherein comparing the engineering bill of materials and the at least one of the manufacturing bills of materials assumes that the parts of the at least one assembly are present in the at least one assembly identified in the at least one of the manufacturing bills of materials, and identifies no differences based on the at least one of the manufacturing bills of materials not identifying the parts of the at least one assembly.

14. The apparatus of claim 10, wherein comparing the different data sets includes:
   comparing the respective unique keys in the different data sets for any unique keys in one of the different data sets that are not in another of the different data sets; and for each unique key that is in the one and the other of the different data sets,
   comparing information associated with the unique key for any differences between the one and the other of the different data sets.

15. The apparatus of claim 14, wherein the different data sets includes a first data set generated earlier than a second data set, and
   wherein comparing the respective unique keys includes identifying an overage of components in the second data set in an instance in which at least one unique key in the second data set is not in the first data set, or an underage of components in the second data set in an instance in which at least one unique key in the first data set is not in the second data set.

16. The apparatus of claim 10, wherein the processor is programmed to perform operations further including in an instance in which differences are identified in the components of the product identified in the different data sets:
   receiving dispositions for the differences to resolve and thereby render the differences unidentifiable;
   recording the dispositions in the storage device with the different data sets;
   comparing again the different data sets and including the dispositions such that the no differences in the components are identified; and
   generating again the visual presentation of the data set, the visual presentation including the indicator that indicates that the different data sets are reconciled.

17. The apparatus of claim 16, wherein receiving dispositions for the differences includes receiving an explanation for any of the differences that are acceptable differences.

18. The apparatus of claim 16, wherein receiving dispositions for the differences includes correcting any of the differences that are errors in at least one of the different data sets.

19. A computer-readable storage medium that is non-transitory and has computer-readable program code portions stored therein that in response to execution by a processor unit, cause an apparatus to at least:
   access a storage device configured to store a plurality of data sets that define a product during respective phases of a lifecycle of the product and identify components of the product by respective unique keys each of which includes a component identifier and an instance identifier, the plurality of data sets including (a) an engineering bill of materials generated during a design phase and defining the product as designed, (b) a sales bill of materials generated during a manufacturing planning phase and defining the product as ordered, and (c) manufacturing bills of material generated during a manufacturing phase and defining the product at respective stages of completion;
   receive a design of a new configuration of the product during an additional, reconfiguration phase of the respective phases of the lifecycle of the product, the new configuration of the product including a change to at least one component of the product as designed, and the plurality of data sets in the storage device including a further bill of materials defining the new configuration of the product; and
   repeatedly perform operations including at least:
   determining any differences in the components of the product between phases of the respective phases, including any differences caused by a phase of the respective phases being incomplete, one or more components being unavailable or discontinued, a change to one or more components, or an error in a data set of the plurality of data sets, determining any differences including comparing different data sets of the plurality of data sets to identify any differences in the components of the product identified therein based on the respective unique keys, comparing the different data sets including at least:
      comparing the engineering bill of materials and the sales bill of materials during the manufacturing planning phase to identify any differences in components of the product as designed and as ordered;
      comparing the sales bill of materials and the manufacturing bills of materials throughout the manufacturing phase to identify any differences in components of the product as ordered and at the respective stages of completion; and
      comparing the engineering bill of materials and the further bill of materials during the reconfiguration phase to identify any differences in components of the product as designed and in the new configuration;
   accessing a policy with criteria for acceptable differences, and including criteria or requirements for changes to the product as designed;

determining, from the policy for any differences so identified, whether the differences meet the criteria and are thereby acceptable differences, or the differences are errors, including determining whether the new configuration of the product meets the criteria or requirements; and generating a visual presentation of a data set of the different data sets for display in a graphical user interface, the visual presentation including components of the product identified in the data set, and for the components in the visual presentation, match indicators to indicate no differences in the components between the data set and another of the different data sets, and difference indicators to indicate any differences in the components between the data set and the other of the different data sets, wherein the visual presentation further includes an indicator that indicates the different data sets are reconciled in an instance in which no differences in the components are identified or the differences are acceptable differences, or that the different data sets are not reconciled in an instance in which the differences include at least one error.

20. The computer-readable storage medium of claim 19, wherein the components of the product include individual parts and at least one assembly of parts, and the engineering bill of materials identifies the individual parts, the at least one assembly and the parts of the at least one assembly by respective unique keys, wherein the sales bill of materials identifies the individual parts and the at least one assembly by respective unique keys but does not identify the pans of the at least one assembly, and wherein comparing the engineering bill of materials and the sales bill of materials assumes that the parts of the at least one assembly are present in the at least one assembly identified in the sales bill of materials, and identities no differences based on the sales bill of materials not identifying the parts of the at least one assembly.

21. The computer-readable storage medium of claim 19, wherein comparing the different data sets further includes comparing the engineering bill of materials and the manufacturing bills of materials throughout the manufacturing phase to identify any differences in components of the product as designed and at the respective stages of completion.

22. The computer-readable storage medium of claim 21, wherein the components of the product include individual parts and at least one assembly of parts, and the engineering bill of materials identifies the individual parts, the at least one assembly and the parts of the at least one assembly by respective unique keys, wherein at least one of the manufacturing bills of materials identifies the individual parts and the at least one assembly by respective unique keys but does not identify the parts of the at least one assembly, and wherein comparing the engineering bill of materials and the at least one of the manufacturing hills of materials assumes that the parts of the at least one assembly are present in the at least one assembly identified in the at least one of the manufacturing bills of materials, and identifies no differences based on the at least one of the manufacturing bills of materials not identifying the parts of the at least one assembly.

23. The computer-readable storage medium of claim 19, wherein comparing the different data sets includes:

comparing, the respective unique keys in the different data sets for any unique keys in one of the different data sets that are not in another of the different data sets; and for each unique key that is in the one and the other of the different data sets, comparing information associated with the unique key for any differences between the one and the other of the different data sets.

24. The computer-readable storage medium of claim 23, wherein the different data sets includes a first data set generated earlier than a second data set, and wherein comparing the respective unique keys includes identifying an overage of components in the second data set in an instance in which at least one unique key in the second data set is not in the first data set, or an underage of components in the second data set in an instance in which at least one unique key in the first data set is not in the second data set.

25. The computer-readable storage medium of claim 19 having further computer-readable program code portions stored therein that in response to execution by the processor unit, cause the apparatus to perform operations further including in an instance in which differences are identified in the components of the product identified in the different data sets:

receiving dispositions for the differences to resolve and thereby render the differences unidentifiable;

recording the dispositions in the storage device with the different data sets;

comparing again the different data sets and including the dispositions such that the no differences in the components are identified; and generating again the visual presentation of the data set, the visual presentation including the indicator that indicates that the different data sets are reconciled.

26. The computer-readable storage medium of claim 25, wherein receiving dispositions for the differences includes receiving an explanation for any of the differences that are acceptable differences.

27. The computer-readable storage medium of claim 25, wherein receiving dispositions for the differences includes correcting any of the differences that are errors in at least one of the different data sets.

* * * * *

UNITED STATES PATENT AND TRADEMARK OFFICE
CERTIFICATE OF CORRECTION

PATENT NO.       : 9,904,896 B2                                Page 1 of 1
APPLICATION NO.  : 13/230534
DATED            : February 27, 2018
INVENTOR(S)      : George Stephen Cowart et al.

It is certified that error appears in the above-identified patent and that said Letters Patent is hereby corrected as shown below:

In the Claims

In Column 31, Claim 11, Line 8, "keys hut does not identity the parts" should read -- keys but does not identify the parts --

In Column 31, Claim 11, Line 11, "the parts of die" should read -- the parts of the --

In Column 33, Claim 20, Line 28, "bill of materials identities the" should read -- bill of materials identifies the --

In Column 33, Claim 20, Line 33, "identify the pans of the" should read -- identify the parts of the --

In Column 34, Claim 22, Line 4, "the manufacturing hills of materials" should read -- the manufacturing bills of materials --

Signed and Sealed this
Thirtieth Day of April, 2019

Andrei Iancu
*Director of the United States Patent and Trademark Office*